(12) United States Patent
Terry et al.

(10) Patent No.: US 8,147,693 B2
(45) Date of Patent: Apr. 3, 2012

(54) MULTI-LAYER FILTER INCLUDING RETAINERS

(75) Inventors: Brian J. Terry, Hilham, TN (US);
Daniel M. Buckner, Cookeville, TN (US); Barry M. Verdegan, Stoughton, WI (US); John W. Clevenger, Jr., Antioch, TN (US); Ravi Yekula, Charlottesville, VA (US)

(73) Assignee: Cumins Filtration IP, Inc., Minneapolis, MN (US)

( * ) Notice: Subject to any disclaimer, the term of this patent is extended or adjusted under 35 U.S.C. 154(b) by 988 days.

(21) Appl. No.: 12/123,653

(22) Filed: May 20, 2008

(65) Prior Publication Data

US 2008/0302717 A1 Dec. 11, 2008

Related U.S. Application Data

(60) Provisional application No. 60/942,869, filed on Jun. 8, 2007.

(51) Int. Cl.
*B01D 27/00* (2006.01)
*B01D 37/00* (2006.01)

(52) U.S. Cl. ........ 210/338; 210/767; 210/457; 210/489; 210/497.01; 210/500.23; 210/493.5; 210/494.3

(58) Field of Classification Search ............. 210/321.86, 210/321.89, 338
See application file for complete search history.

(56) References Cited

U.S. PATENT DOCUMENTS

| | | | |
|---|---|---|---|
| 4,292,179 A * | 9/1981 | Stone et al. | 210/443 |
| 4,640,779 A | 2/1987 | Taki et al. | |
| 5,824,232 A | 10/1998 | Asher et al. | |
| 6,103,119 A * | 8/2000 | Clements et al. | 210/493.1 |
| 6,641,742 B2 | 11/2003 | Prater et al. | |

* cited by examiner

*Primary Examiner* — Krishnan S Menon
*Assistant Examiner* — Allison M Gionta
(74) *Attorney, Agent, or Firm* — Hamre, Schumann, Mueller & Larson, P.C.

(57) ABSTRACT

A multi-layer filter including a first media layer surrounded by a second media layer, a third media layer surrounding the second media layer, and at least one retainer disposed between the first and second media layers or between the second and third media layers. The first, second and third media layers surround the central axis of the filter. The filter has multiple media layers in a compact package, providing increased media surface area which allows greater contaminant holding capacity, lower pressure drop, and lower face velocity.

9 Claims, 23 Drawing Sheets

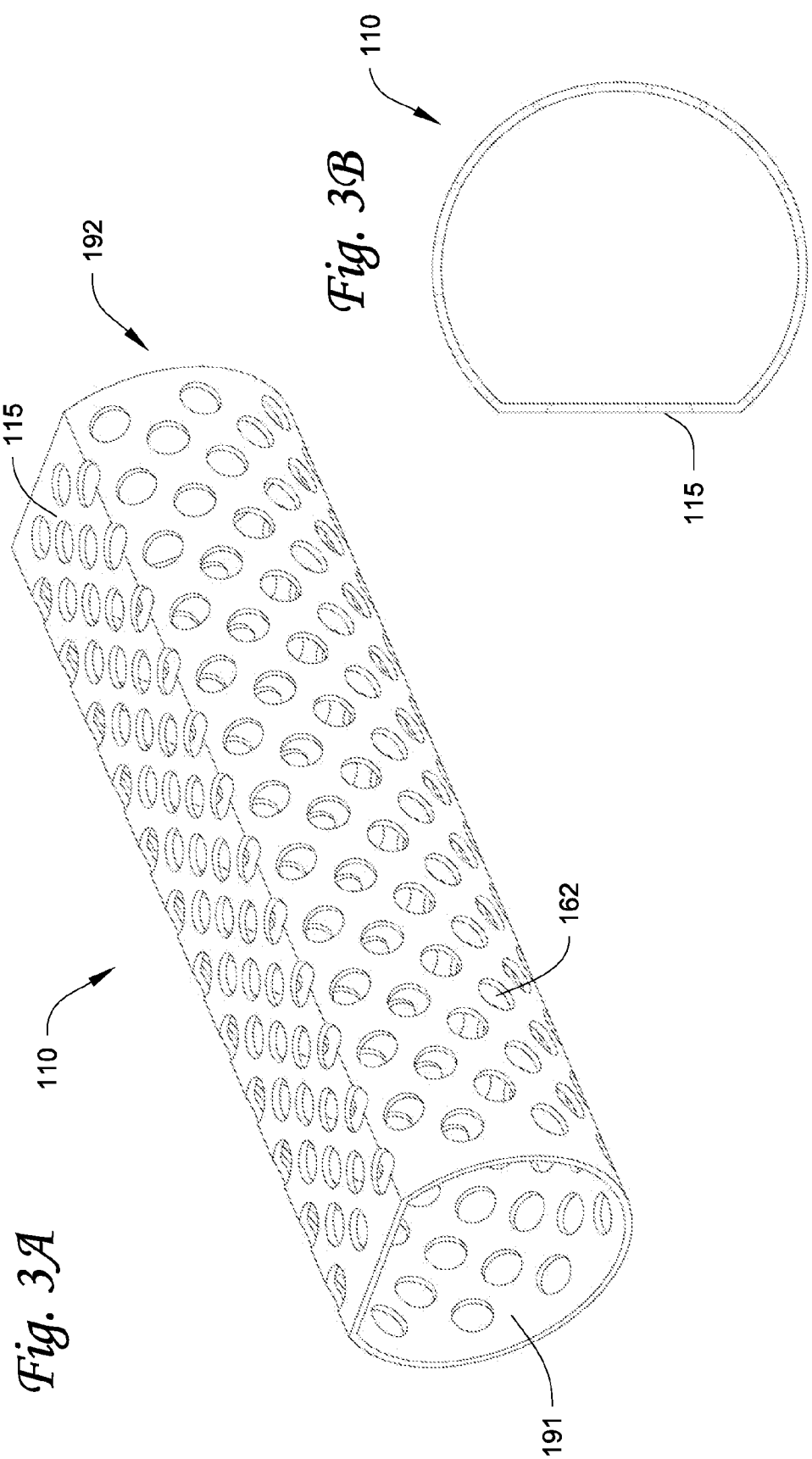

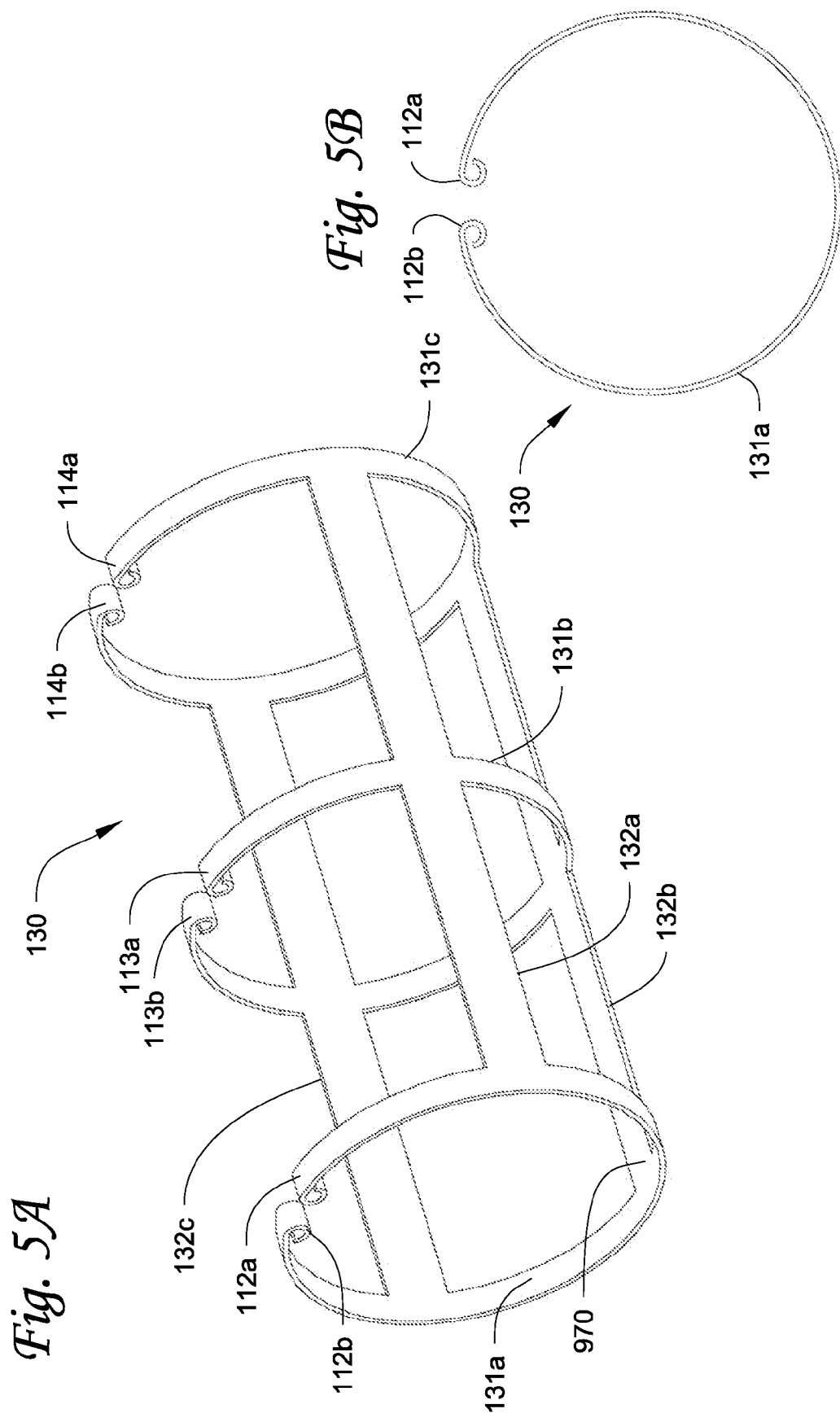

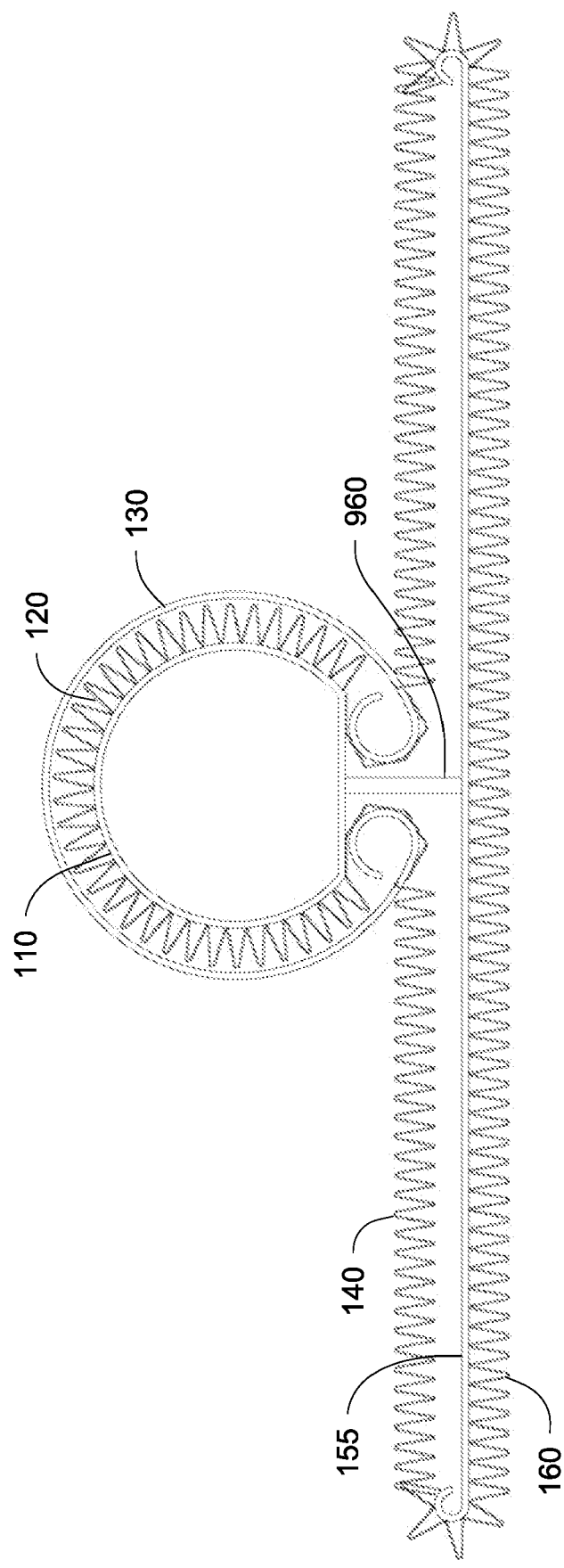

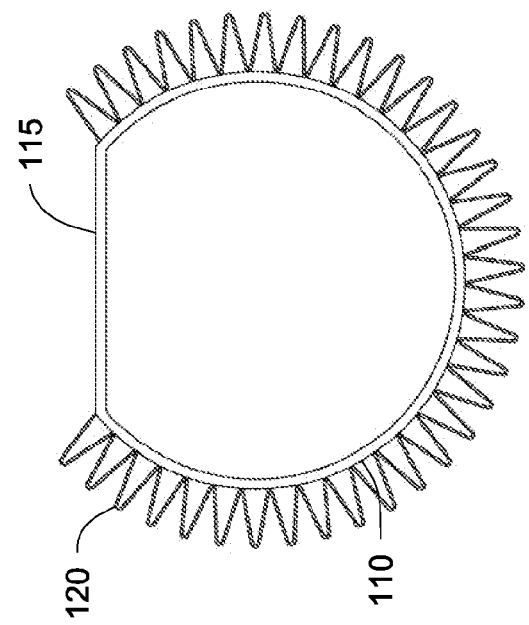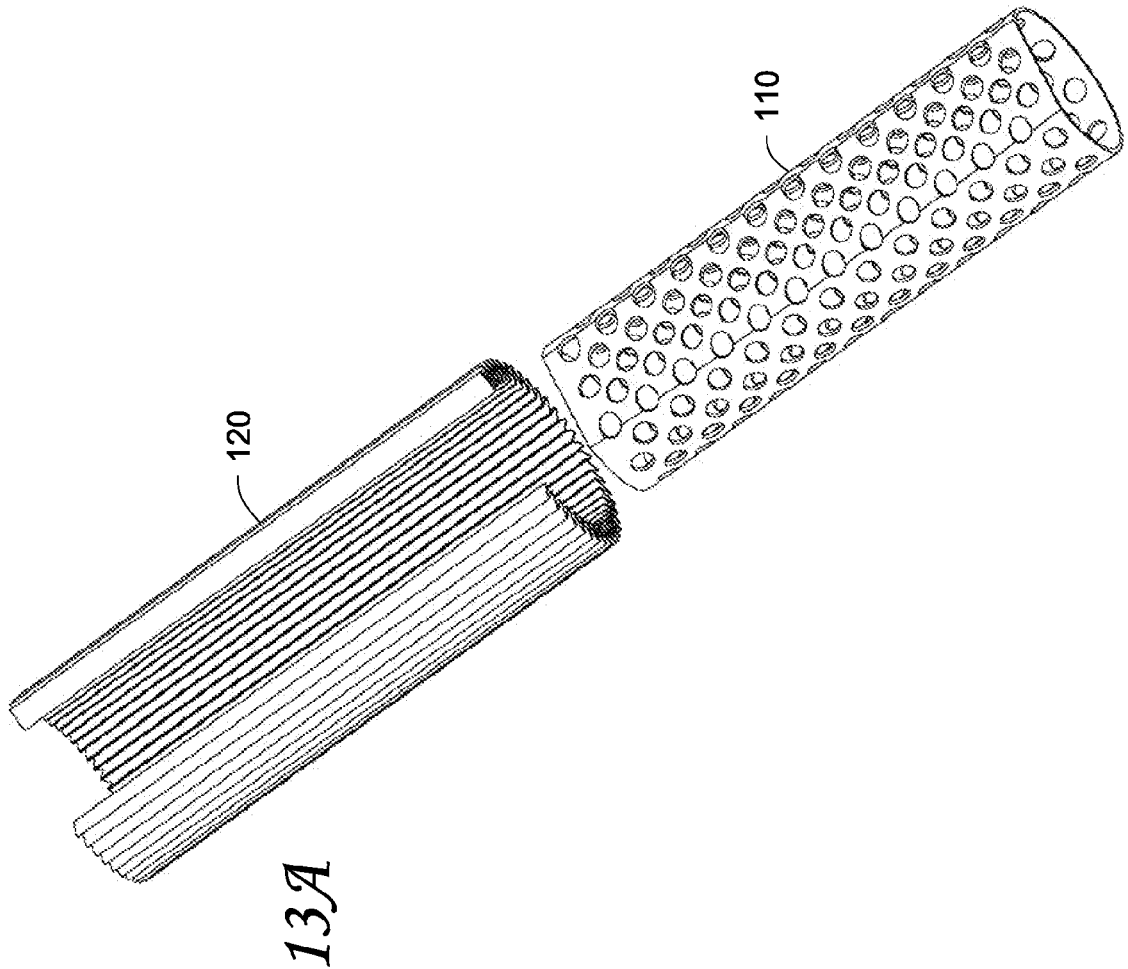

MULTI-LAYER FILTER INCLUDING RETAINERS

This application claims the benefit of U.S. Provisional Application No. 60/942,869, filed Jun. 8, 2007, and which is incorporated herein by reference in its entirety.

FIELD

This disclosure relates to filters, in particular fuel filters used for particulate filtration, fuel-water separation, and coalescing.

BACKGROUND

Fuel can be subject to a number of different contaminants including, but not limited to, particulates and water. A large number of fuel filters have been designed in the past to remove these contaminants from fuel.

For fuel filters, increasing the filter media surface area allows for a greater amount of fluid flow area, thereby leading to higher filtration capacity. Therefore, a fuel filter that is designed to have an increased filter media surface area for filtering would be beneficial.

SUMMARY

A filter for removing contaminants from fluid is described that is designed to enhance capacity so as to allow longer service intervals and achieve a reduction in maintenance costs, while retaining a compact size. The disclosed filter is designed to have multiple media layers in a compact package, providing increased media surface area which allows greater contaminant holding capacity, lower pressure drop, and lower face velocity.

In one embodiment, a filter includes multiple layers of media surrounding a central axis of the filter, an inner and middle media retainer, a center tube and an endplate. The media layers can be formed by a single length of filter media or by separate media. The media layers can have the same or differing construction, for example the same or differing porosity, the same or differing materials, the same or differing pleat construction, etc.

The concepts described herein can be implemented on many types of filters filtering a number of fluids including liquid, gases etc. Where liquid is used, the liquid can be fuel, such as diesel fuel, gasoline, etc., and oil.

BRIEF DESCRIPTION OF THE DRAWINGS

FIGS. 3A and 3B are perspective and end views of one embodiment of a center tube.

FIGS. 5A and 5B are perspective and end views of one embodiment of an inner media retainer.

FIG. 12 is a view of a first wrap stage during filter assembly using the attachment.

FIGS. 13A and 13B are views of an inner media layer wrapped around the center tube.

DETAILED DESCRIPTION

A multi-layered filter is described having increased filter media surface area for removing contaminants from fluid. In general, the multi-layered filter includes a center tube, first, second and third media layers surrounding the center tube, at least one retainer situated between the first and second media layers and/or between the second and third media layers, and an endplate. The media layers may be separate layers or formed by a single length of media. The retainer includes three bands and a plurality of support strips attached to the three bands. The retainers are configured to retain a geometrical form of the filter.

In the following exemplary embodiments, the filters can be used to filter various fluids including, but not limited to, fuel, water, oil, air etc. In addition, in appropriate circumstances, the concepts described herein can be used to remove various contaminants from the fluid, for example removing particulate matter from fuel, removing water from fuel, and the like.

Figure 1:
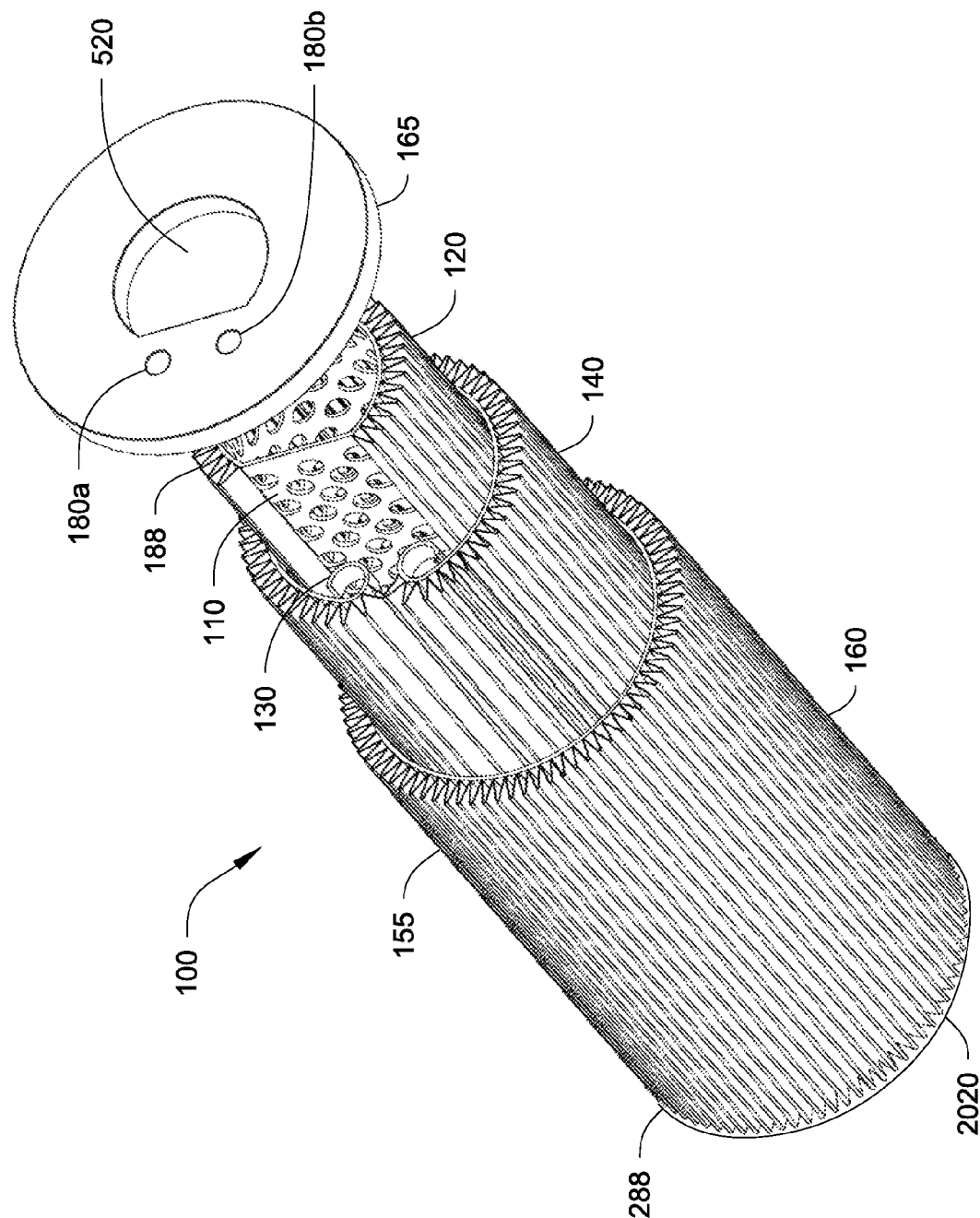
FIG. 1 is a perspective exploded view of the components of one embodiment of the filter construction.
Figure 2:
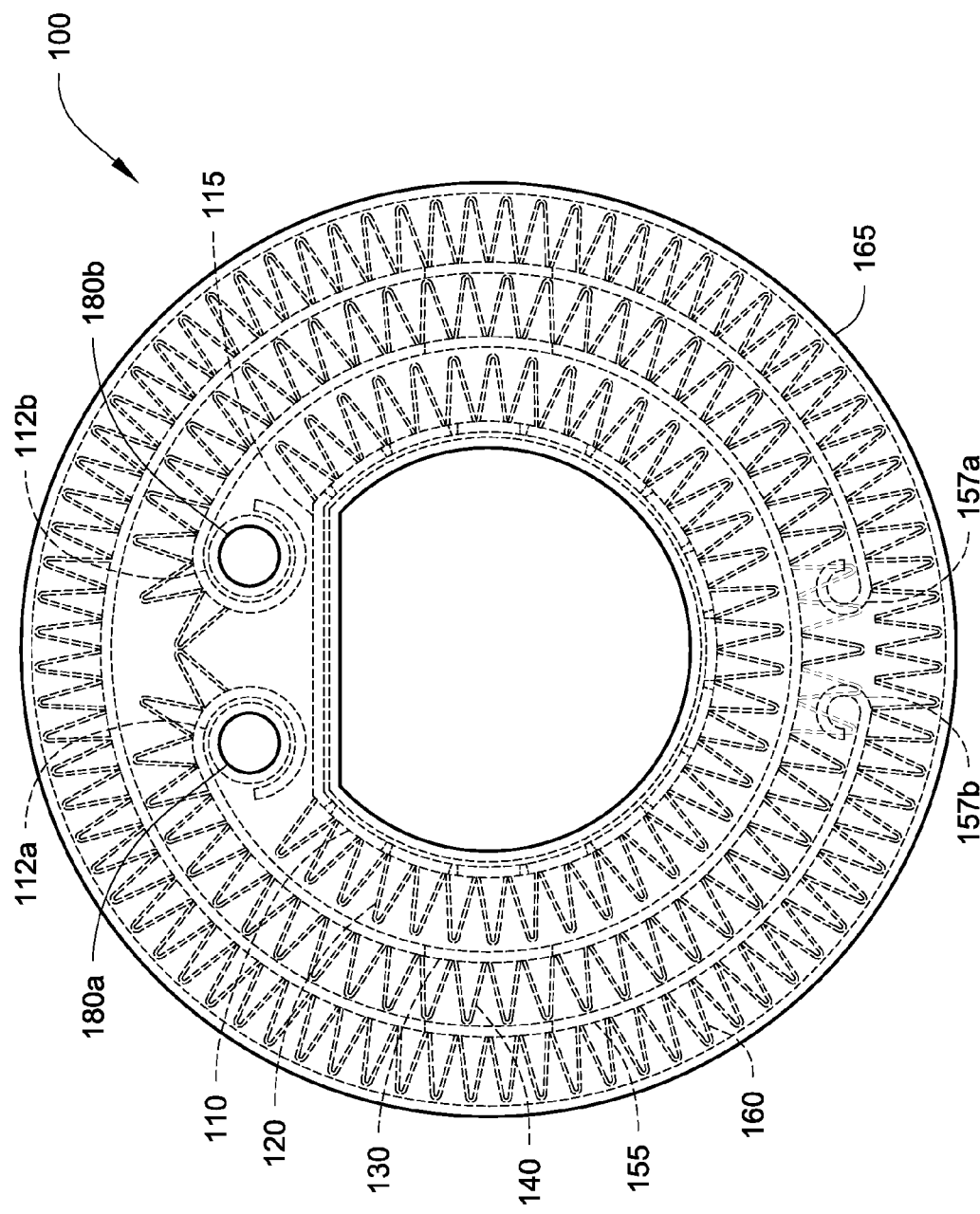
FIG. 2 is a cross sectional view of the filter in FIG. 1.

FIGS. 1 and 2 illustrate a multi-layered filter 100 that includes an outer media layer 160, a middle media layer 140 and an inner media layer 120 for filtering a fluid, for example fuel, and that is particularly suited for removing contaminants such as water from the fuel.

Fuels can include water therein in different forms, including free water, e.g. droplets, and emulsified water. In one example, the outer media layer 160 is designed so that free water is initially filtered when fluid enters the filter 100 from the outside. The free water does not penetrate the outer media layer 160 and remains substantially outside the filter 100. The middle media layer 140 is designed to coalesce the majority of the emulsified water and separate the now coalesced water from the fuel. Water, being heavier than fuel, settles down to the bottom of the filter 100, and drains through suitable passageways on a bottom endplate 165. By the time the fuel interfaces with the inner media layer 120, most of the water has been separated, and the inner media layer 120 performs a final filtration of the fuel before the fuel enters a center tube 110. The center tube 110, which is included in the filter 100, is a perforated "D" shaped tube for receiving the filtered fuel.

As shown in FIGS. 1 and 2, sandwiched between the inner media layer 120 and the middle media layer 140 is an inner media retainer 130 for holding the media layers 120, 140 in place while providing form for the media layers 120, 140. As will be described in detail below, facing ends of the inner media retainer 130 form two large retainer loops 112a, 112b, which provide a relatively large space between the inner media layer 120 and the middle media layer 140 in the area of the flat part of the "D" shaped center tube 110.

Figure 4A:
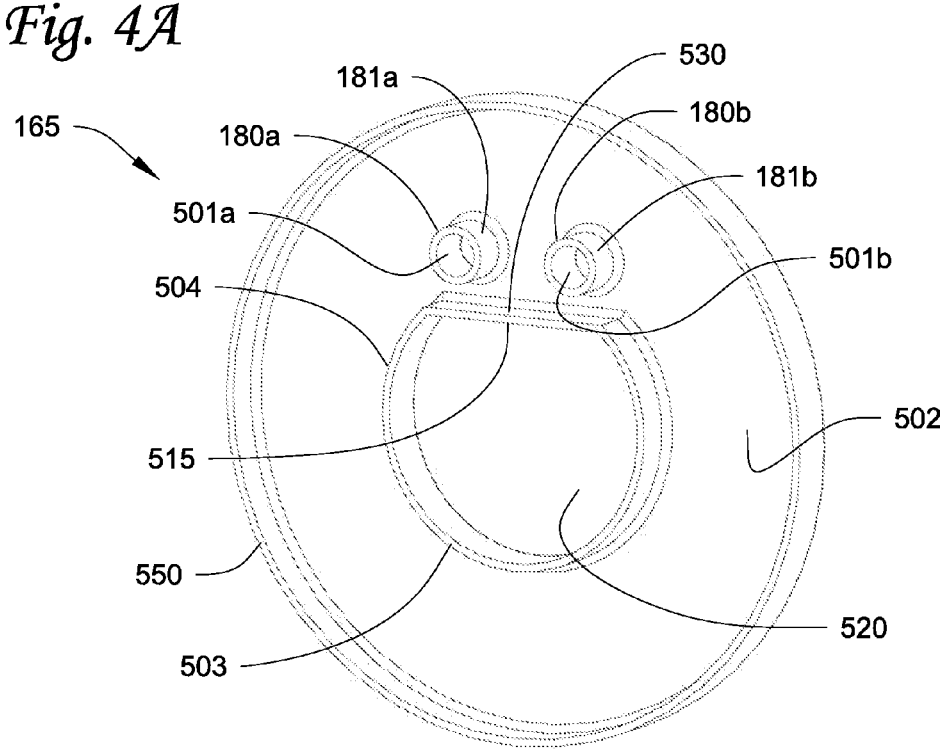
FIGS. 4A and 4B are perspective and top views of one embodiment of a bottom endplate.
Figure 4B:
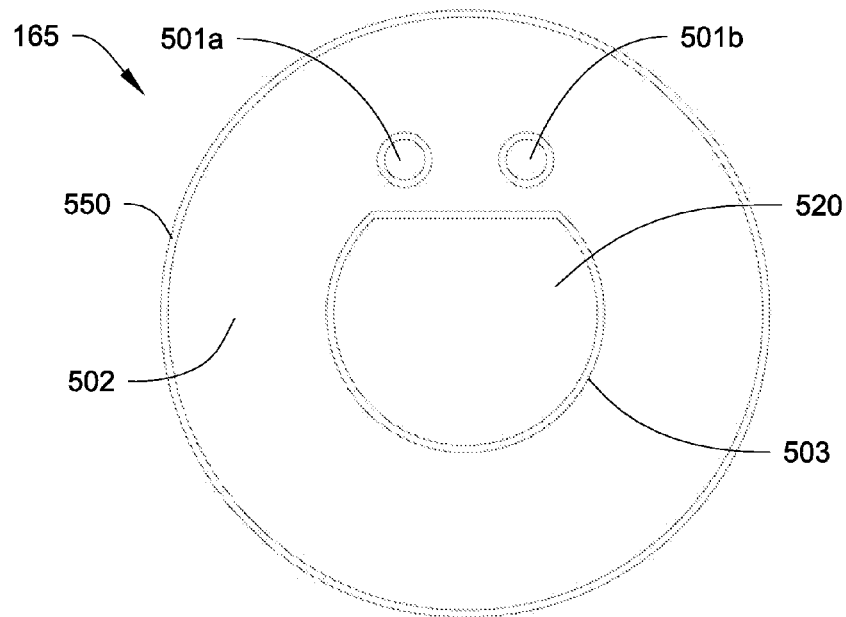

With reference to FIGS. 4A and 4B, inner media retainer standoffs 180a, 180b and the inner media retainer loops 112a, 112b align the inner media retainer 130 on a bottom endplate 165. Sandwiched between the middle media layer 140 and the outer media layer 160 is a middle media retainer 155 for retaining the form of the media layers 140, 160 and providing space between the layers 140, 160. Facing ends of the middle media retainer 155 form two retainer loops 157a, 157b. In addition, the bottom endplate 165 is provided on a first end 188 of the filter 100, and a top endplate 2020 is provided on a second end 288 of the filter 100.

Center Tube

FIGS. 3A and 3B illustrate one embodiment of the center tube 110 that can be used. The center tube 110 has a cross section forming a D-shape. The center tube 110 has a first end 191 and a second end 192, either of which can be positioned around a "D" shaped center tube standoff 504 (not shown), and a flat side 115. The center tube 110 has a plurality of pores 162 through which the filtered fluid can enter the tube 110 for subsequent discharge to an exit.

Bottom Endplate

FIGS. 4A and 4B illustrate one embodiment of the bottom endplate 165. The bottom endplate 165 includes the "D" shaped center tube standoff 504 having a ridge 503 for positioning the "D" shaped center tube 110. Inside the "D" shaped center tube standoff 504 is a "D" shaped center tube hole 520 through which fuel exits the filter 100. Aligned on a flat side 530 of the "D" shaped center tube standoff 504 are the two inner media retainer standoffs 180a, 180b having ridges 181a, 181b, which provide a place for the ends of the inner media retainer 130 to loop around. Water separation drains 501a, 501b through the inner media retainer standoffs 180a, 180b allow water that is coalesced by the middle media layer 140 to drain from the filter 100 to a water collection area (not shown). The bottom endplate 165 also includes an area 502 where ends of the media layers 120, 140, 160 can be fused, and an outer ridge 550 that is generally circular. The specific depth of the ridges 550, 181a, 181b, 503 is not particularly limited, so long as the ridges are raised sufficiently to facilitate the correct positioning of the filter components.

Retainers

FIGS. 5A and 5B shows one example of the inner media retainer 130. The inner media retainer 130 is cylindrically shaped and comprises first, second and third substantially circular, vertically spaced bands 131a, 131b, 131c, which aid in retaining the form of the inner and middle media layers 120, 140, while maximizing the area for fuel to flow to minimize flow obstruction. Facing ends of the bands, for example the band 131a, are formed into the retainer loops 112a, 112b, which, in the case of the lowermost band adjacent to the endplate 165, are positioned around the inner media retainer standoffs 180a, 180b. The retainer loops 112a, 112b also create a space between the inner media layer 120 and middle media layer 140 in the area of the flat part 115 of the "D" shaped center tube 110. Likewise, facing ends of the second circular band 131b also form two retainer loops 113a, 113b, and facing ends of the third circular band 131c form two retainer loops 114a, 114b.

The inner media retainer 130 also is provided with first, second and third generally vertical support strips 132a, 132b, 132c. The strips 132a, 132b, 132c and the circular bands 131a, 131b, 131c provide the retainer 130 with a generally cylindrical shape. Preferably, the first circular band 131a is positioned at the top, the second circular band 131b is positioned in the middle and the third circular band 131c is positioned on the bottom. The strips 132a, 132b, 132c extend from the first circular band 131a to the third circular band 131c, and the second strip 132b is positioned generally opposite the retainer loops 112a, 112b, 113a, 113b, 114a, 114b. The first and third strips 132a, 132c are situated across from each other and positioned in between the second strip 132b and the retainer loops 112a, 112b, 113a, 113b, 114a, 114b.

Figure 6A:
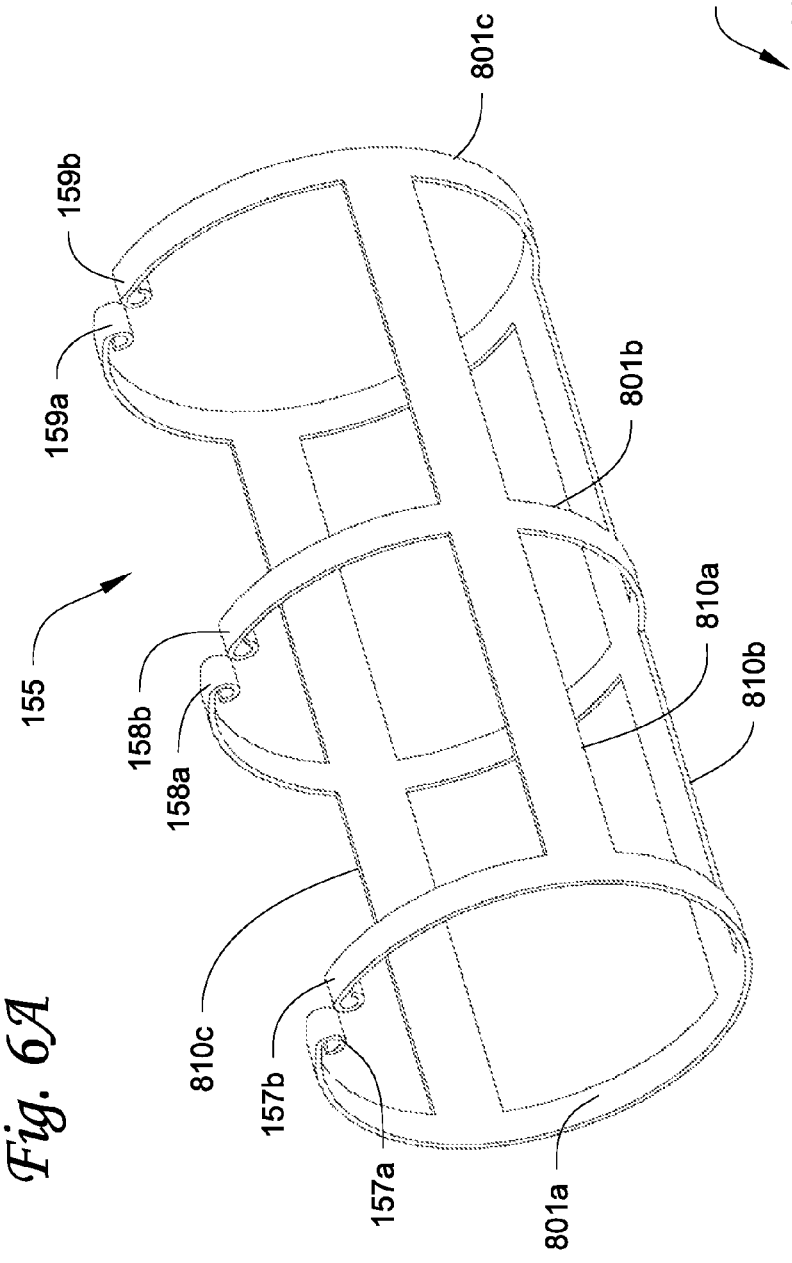
FIG. 6A is a perspective view of one embodiment of a middle media retainer.

With reference to FIG. 6A, the middle media retainer 155 is also generally cylindrically shaped and comprises first, second and third circular bands 801a, 801b, 801c which help retain the form of the outer and middle media layers 160, 140. Facing ends of the circular bands 801a, 801b, 801c form retainer loops 157a, 157b, 158a, 158b, 159a, 159b. The middle media retainer 155 also comprises first, second and third generally vertical support strips 810a, 810b, 810c. The strips 810a, 810b, 810c and the circular bands 801a, 801b, 801c provide the retainer 155 with a generally cylindrical shape. Preferably, the first circular band 801a is positioned at the top, the second circular band 801b is positioned in the middle and the third circular band 801c is positioned on the bottom. The strips 810a, 810b, 810c extend from the first circular band 801a to the third circular band 801c, and the second strip 810b is positioned generally opposite the retainer loops 157a, 157b, 158a, 158b, 159a, 159b. The first and third strips 810a, 810c are situated across from each other and positioned in between the second strip 810b and the retainer loops 157a, 157b, 158a, 158b, 159a, 159b.

Figure 6B:
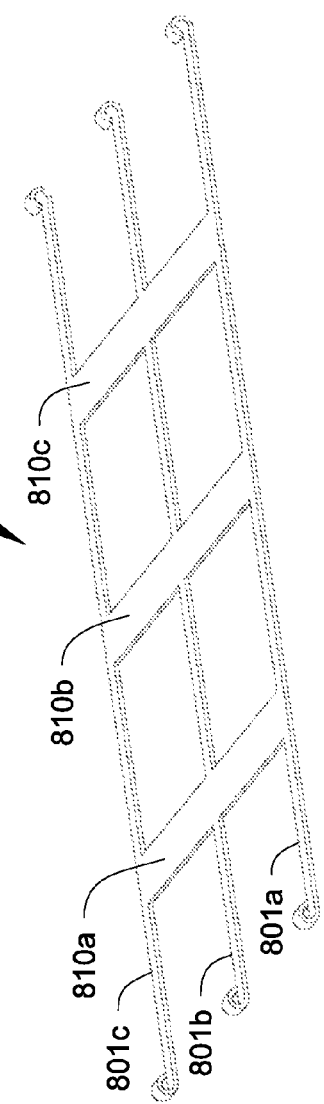
FIG. 6B is a perspective view of the middle media retainer in a flattened configuration.

The specific material for the inner and middle media retainers 130, 155 is not critical. The retainers can be made of metal, plastic, or any other type of material suitable for use with fuel or fluid being filtered. Preferably, the construction and material of the middle media retainer 155 renders it flexible so as to allow the middle media retainer 155 to spread open as illustrated in FIG. 6B.

Figure 7:
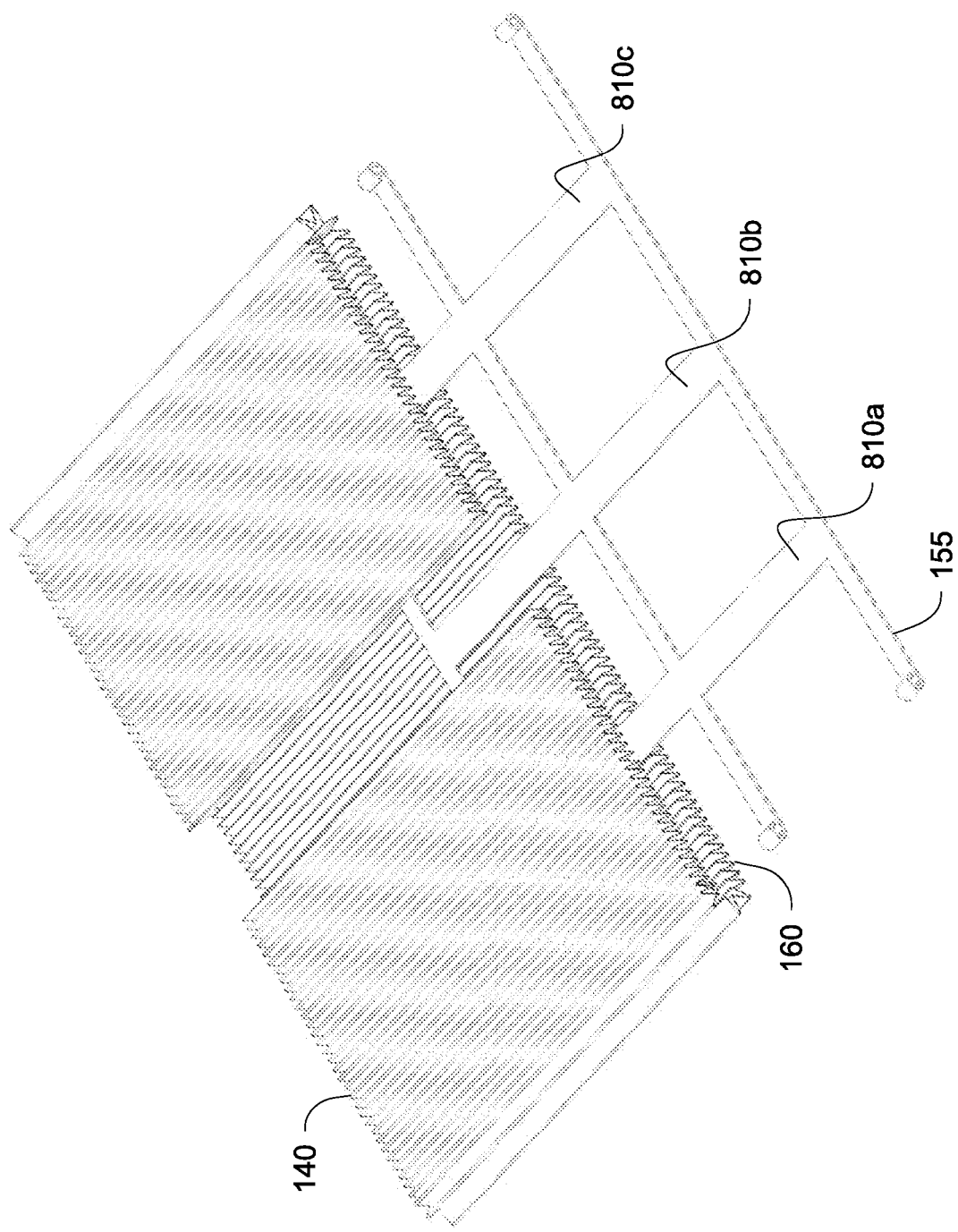
FIG. 7 is a perspective view of an embodiment of an initial set up during filter assembly.
Figure 8:
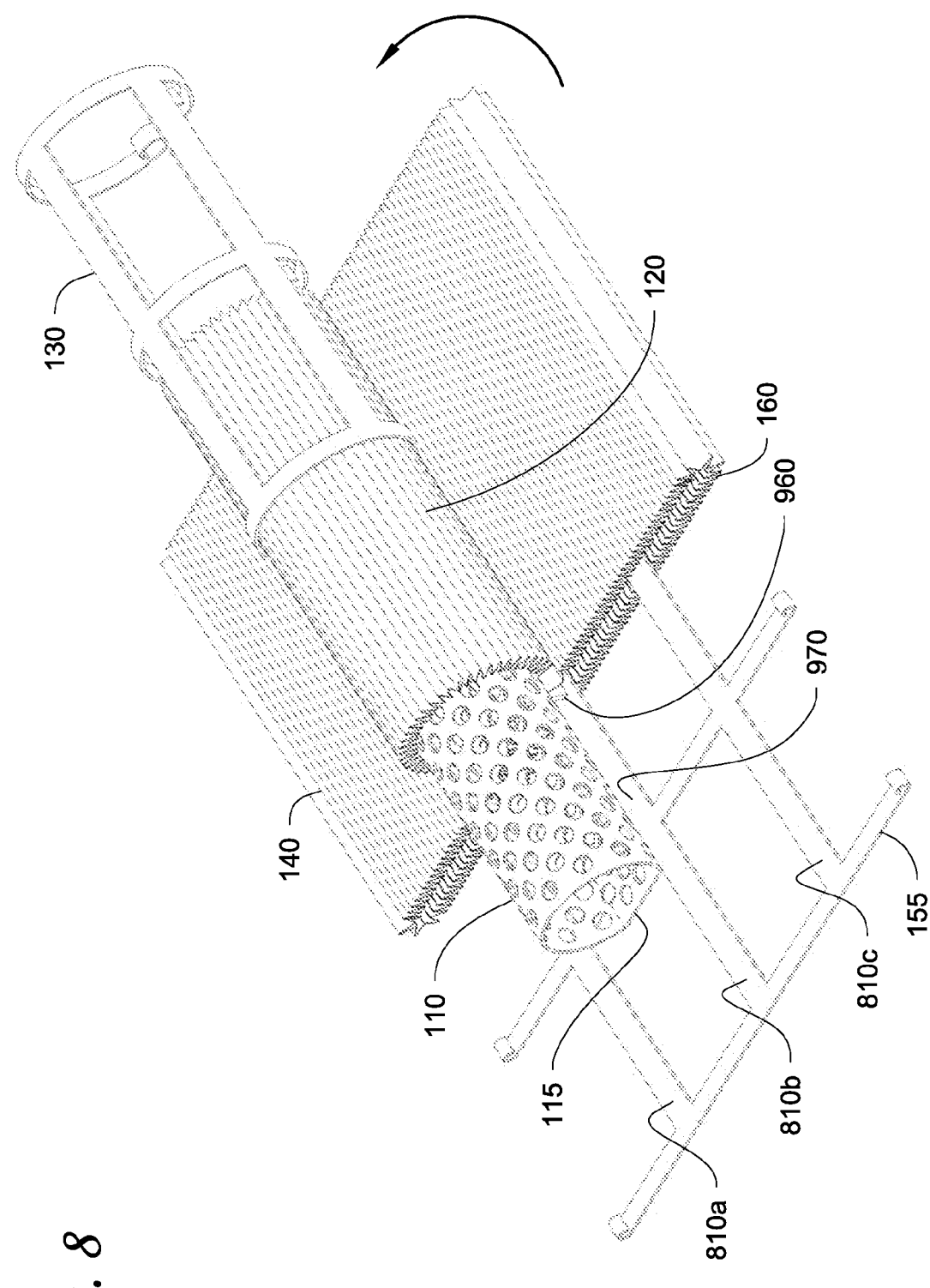
FIGS. 8 and 9 are views of a first wrap stage during filter assembly.
Figure 9:
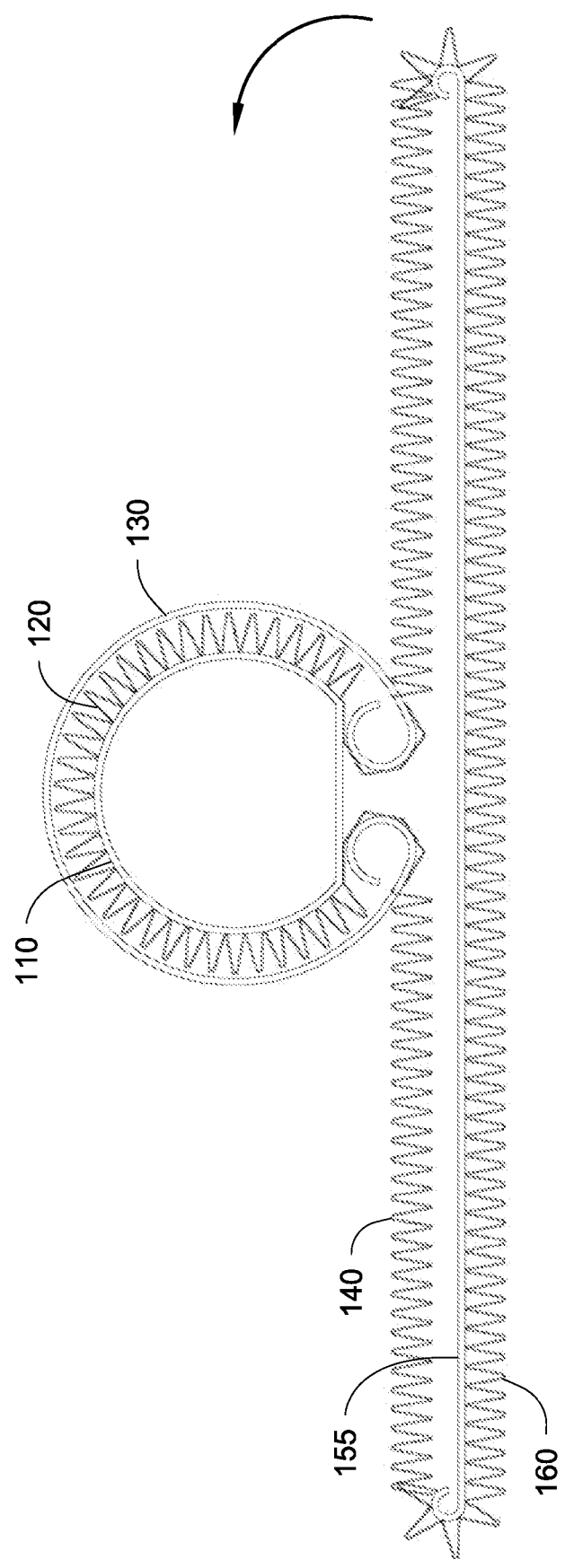

The opened configuration of the middle media retainer 155 facilitates the assembly process as depicted in FIGS. 7-9. The initial set up of one embodiment of an assembly process involves the middle media retainer 155 being spread open in a flattened configuration, as depicted in FIG. 7. The middle media retainer 155 in the flattened configuration is sandwiched between the outer media layer 160 and the middle media layer 140. Referring to FIGS. 8 and 9, the assembly process includes wrapping the inner media layer 120 around the center tube 110, wrapping the inner media retainer 130 around the inner media layer 120, and then wrapping the middle media retainer 155 that is sandwiched between the outer and middle media layers 160, 140 around the inner media retainer 130. The ridges 550, 181a, 181b, 503 on the bottom endplate 165 facilitate the positioning of the media layers 120, 140, 160 and retainers 130, 155 during the assembly process.

Figure 10:
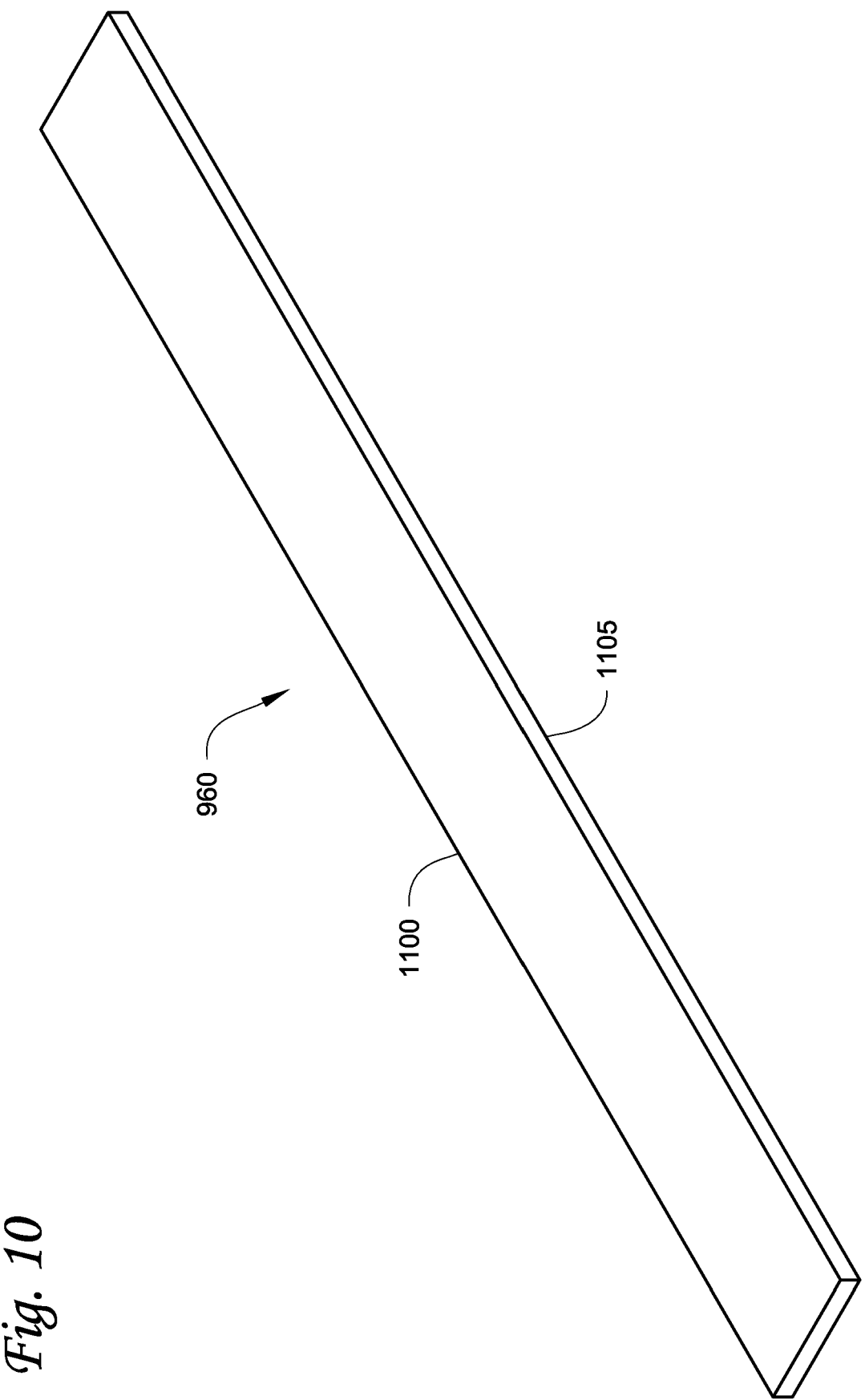
FIG. 10 is a perspective view of one embodiment of an attachment.
Figure 11:
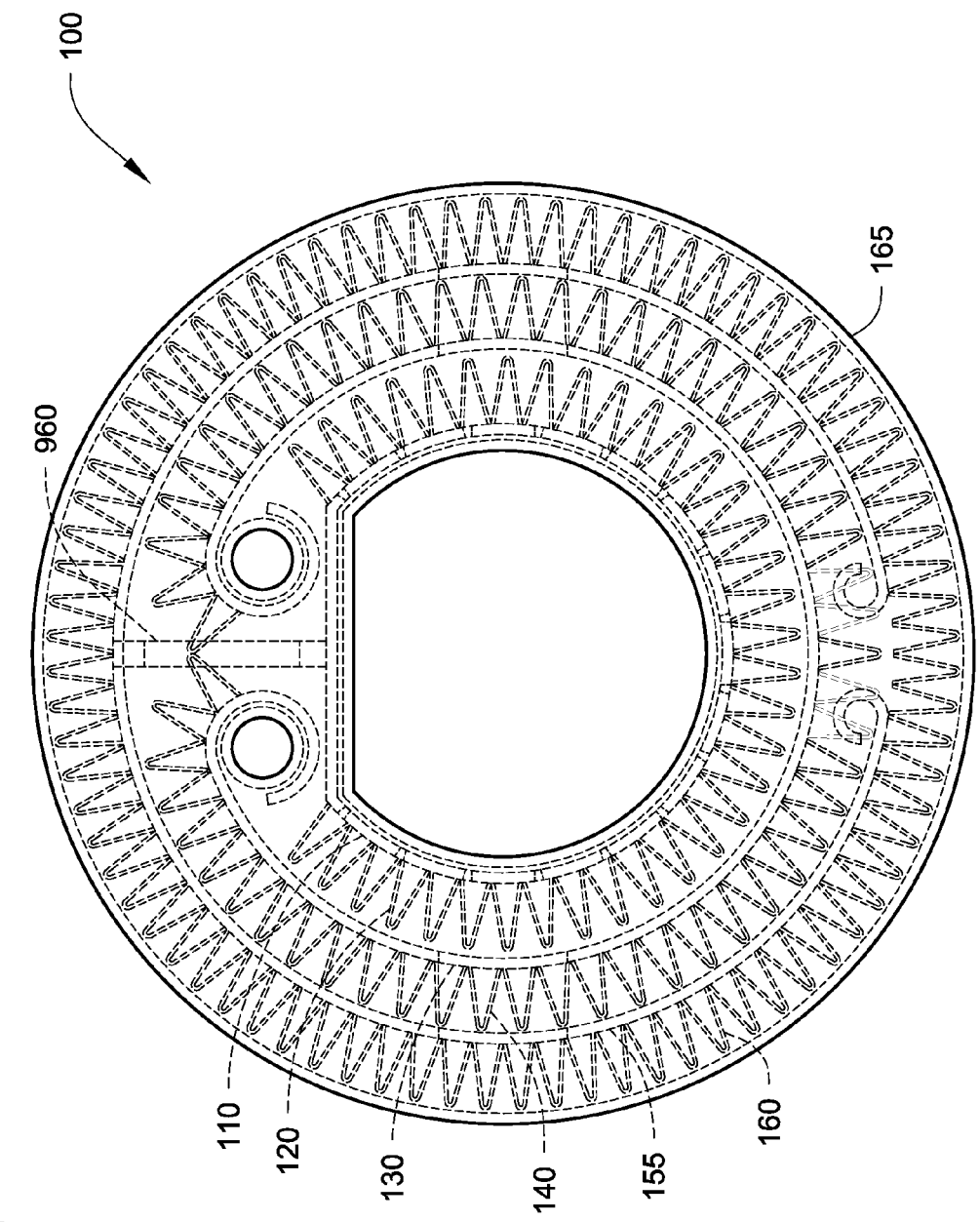
FIG. 11 is a cross-sectional view of a multi-layered filter similar to FIG. 2 but with an attachment between the center tube and the middle media retainer.

Preferably, as illustrated in FIGS. 11 and 12, the center tube 110 is attached to the middle media retainer 155 via an attachment 960 to further facilitate the assembly process by keeping the center tube to be wrapped together with the retainer 155. FIG. 10 shows one embodiment of the attachment 960. The attachment 960 is generally rectangular in shape, and has a first end 1100 and a second end 1105. The attachment 960 extends along the second strip 810b. Preferably, the first end 1100 of the attachment 960 is attached to the inward surface 970 of the second strip 810b and the second end 1105 is attached to the flat surface 115 of the "D" shaped center tube 110, as shown in FIG. 8.

Media Layers

FIGS. 13A and 13B illustrate one embodiment of how the inner media layer 120 is wrapped around the "D" shaped center tube 110. The inner media layer covers the "D" ring, but not the flat side 115 of the "D" shaped center tube 110.

Figures 14A, 14B:
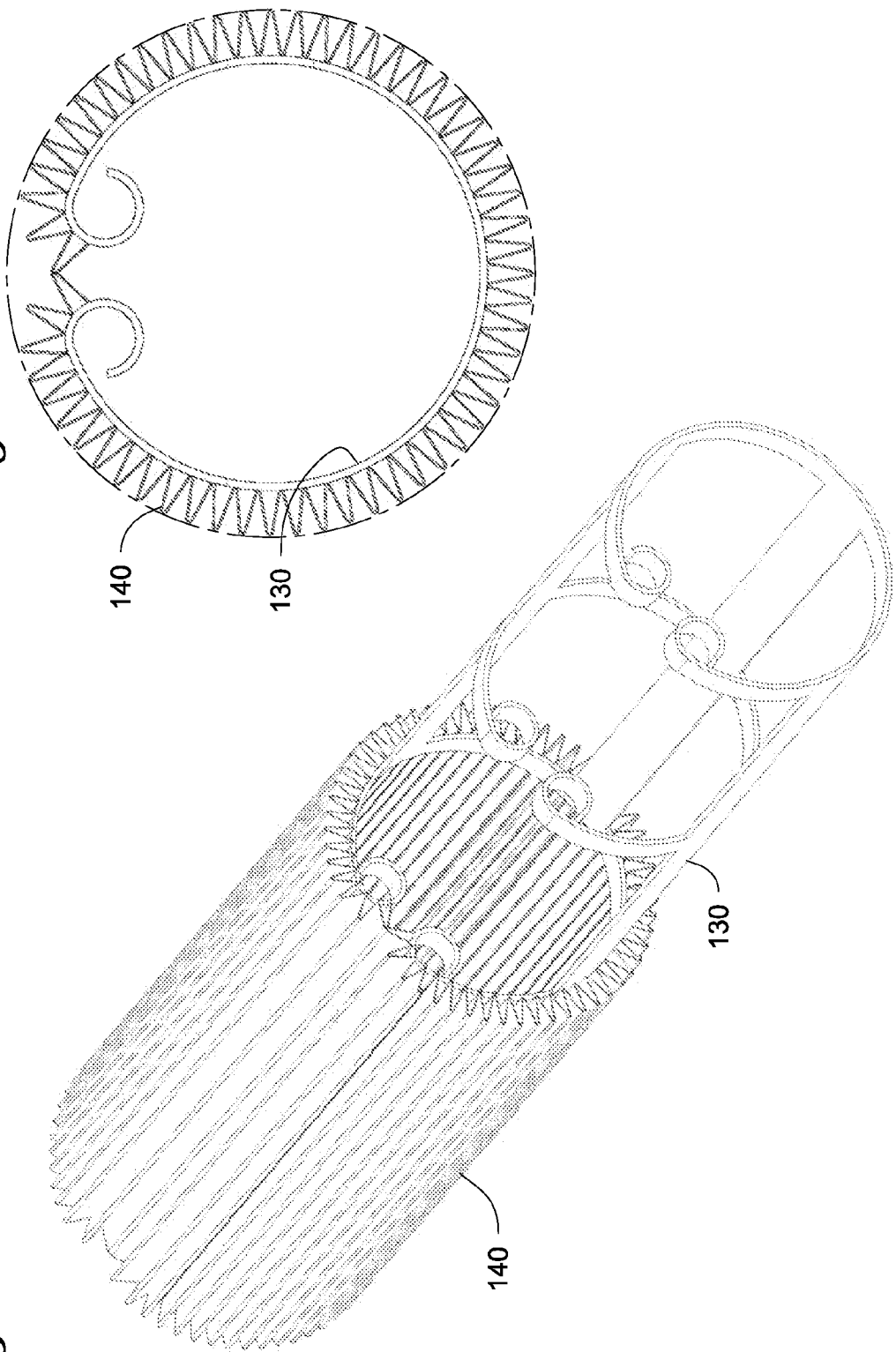
FIGS. 14A and 14B are views of the middle media layer wrapped around the inner media retainer.

FIGS. 14A and 14B illustrate one embodiment of how the middle media layer 140 is wrapped around the inner media retainer 130. Preferably, the middle media layer 140 covers the inner media retainer 130 along the surface of the retainer 130, as shown in FIG. 14B.

Figure 15B:
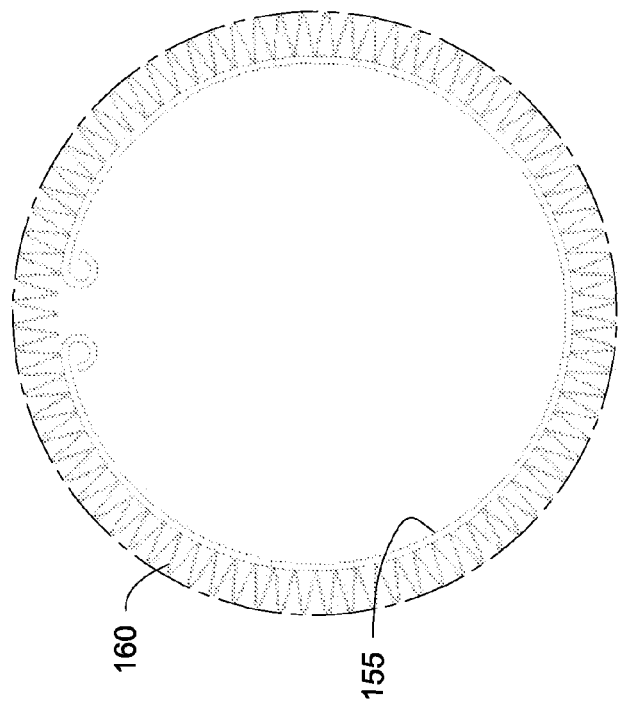
FIGS. 15A and 15B are views of the outer media layer wrapped around the middle media retainer.
Figure 15A:
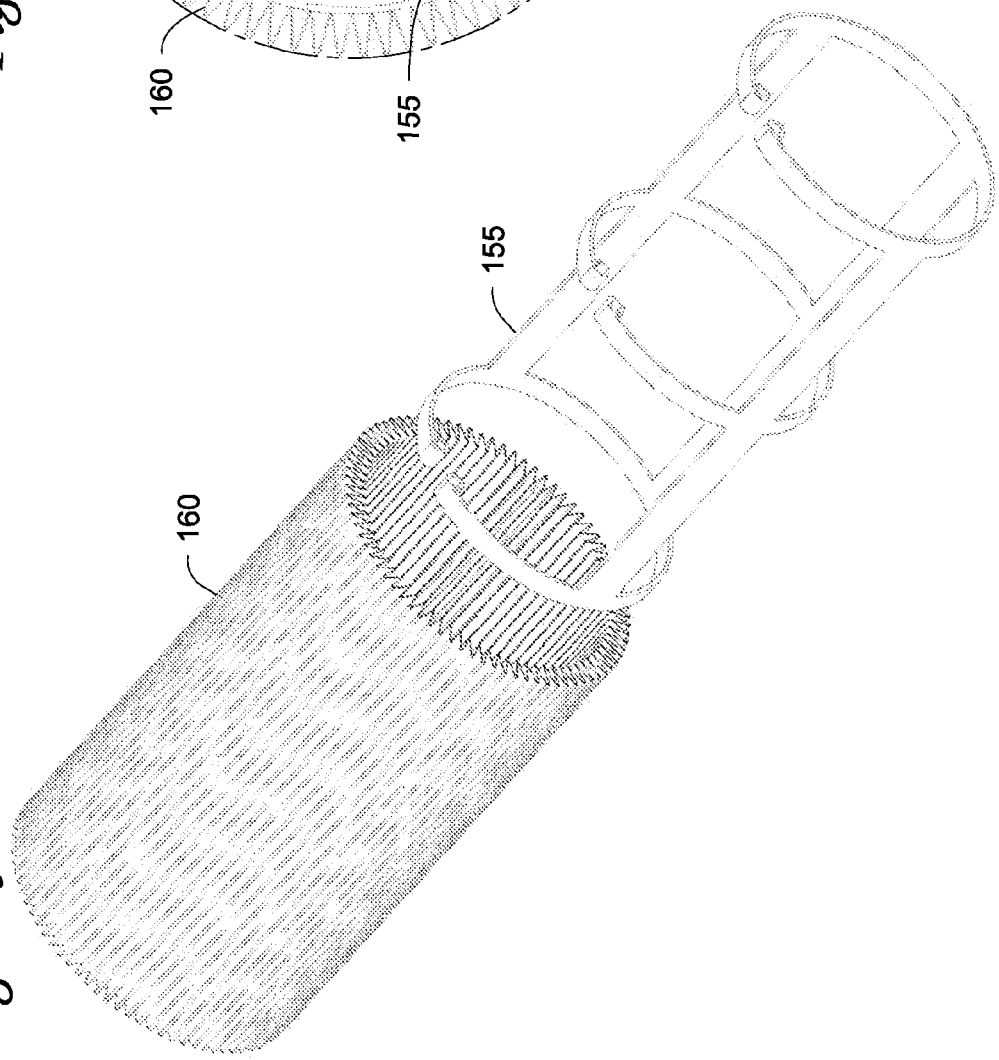
Figure 16A:
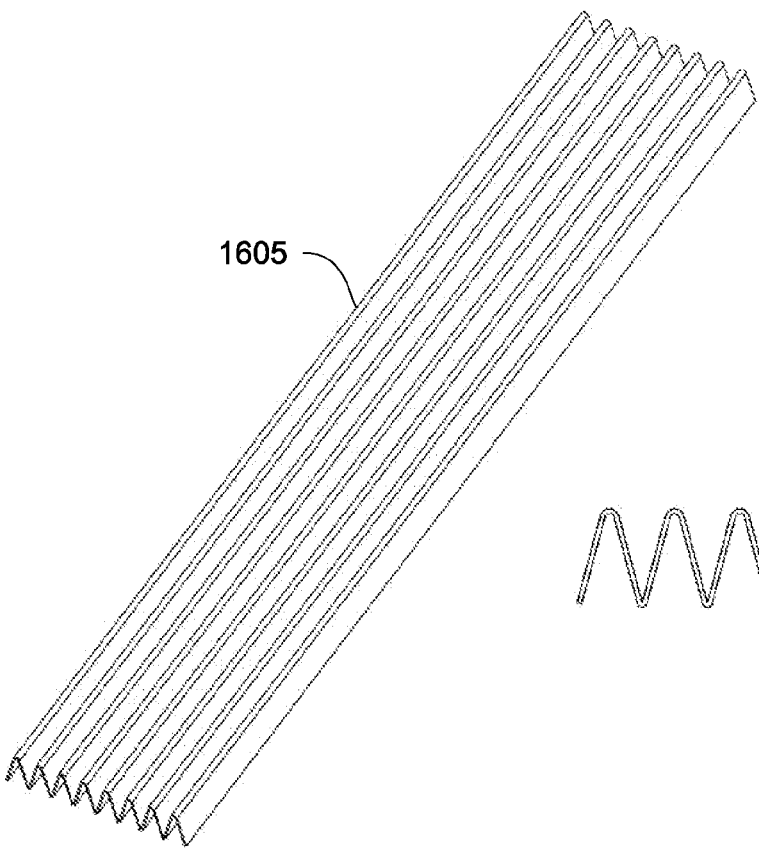
FIGS. 16A, 16B, 17A and 17B are examples of pleat shapes that could be employed for the filter media.
Figure 16B:
Figure 17A:
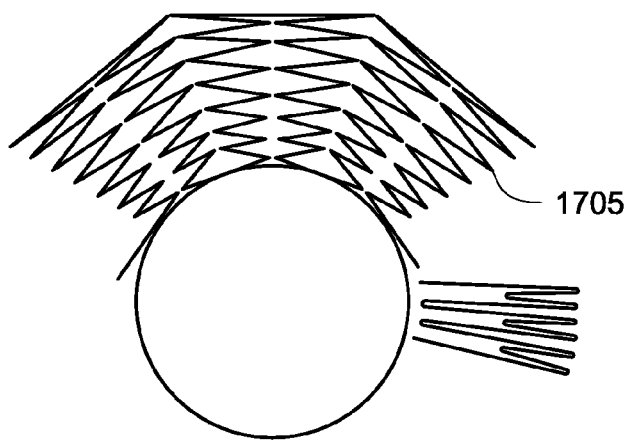
Figure 17B:
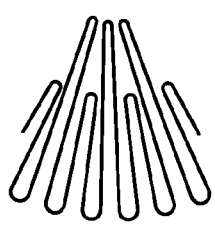

FIGS. 15A and 15B illustrate one embodiment of how the outer media layer 160 is wrapped around the middle media retainer 155. Preferably, the outer media layer 160 is fully wrapped around the middle media retainer 155.

The design of the shapes in the media is not limited to any type. They may be pleats, and the pleats may be "W" pleats as described in U.S. Pat. No. 2,627,350, wedge shaped, etc. FIGS. 16A, 16B, 17A and 17B show some examples of designs that can be used in the media.

The specific material for the media layers 120, 140, 160 is not particularly limited. For example, the inner media layer 120, the middle media layer 140 and the outer media layer 160 can have different porosity ratings. In one embodiment, the outer media layer 160 has a porosity sufficient to separate free water, the middle media layer 140 has a relatively smaller porosity to separate emulsified water, and the inner media layer 120 has a porosity for filtering particulate contaminants from the fluid. Alternatively, the media layers 120, 140, 160 can have identical porosity ratings.

Figure 18A:
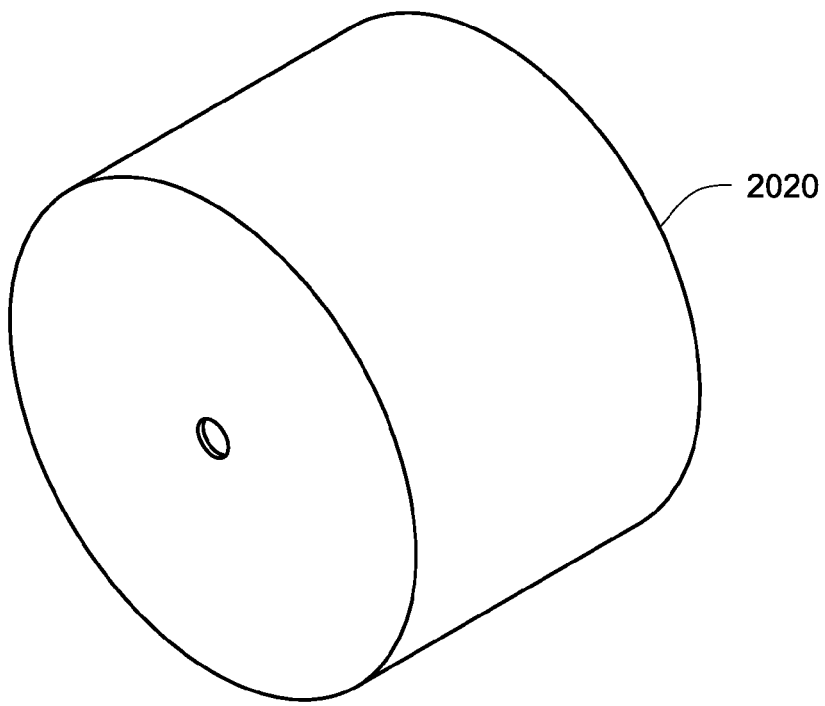
FIG. 18A shows one embodiment of a top endplate.
Figure 18B:
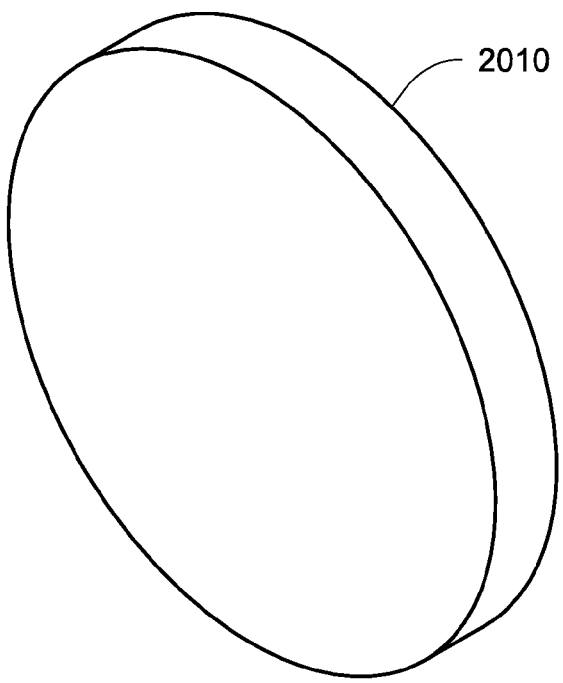
FIG. 18B shows one embodiment of a media disc.
Figure 19:
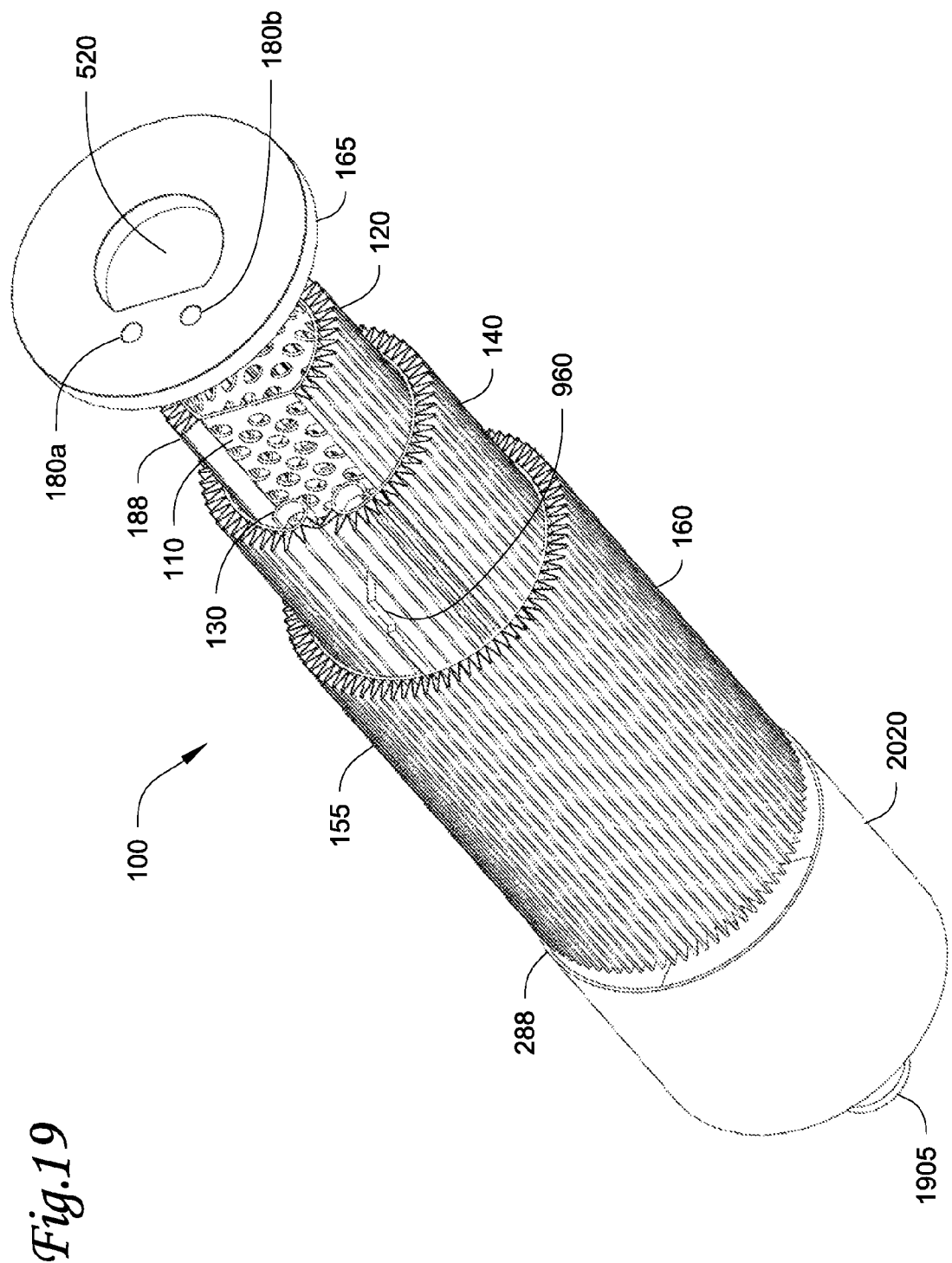
FIG. 19 shows one embodiment of a top endplate being disposed on the second end of the filter.

In one implementation, the media layers 120, 140, 160 can be secured to the bottom endplate 165 in any suitable manner, for example using an adhesive or fusing the ends of the media layers 120, 140, 160 to the endplate 165. In another implementation, a half wrap 2020, FIG. 18A, as described in U.S. Pat. No. 6,641,742, or a flat endplate 2010, FIG. 18B, may be secured to the second end 288 of the filter 100. In yet another implementation, a media disc valve 1905, FIG. 19, as described in U.S. Pat. Nos. 6,641,742 and 6,758,980, can be utilized on the upper endplate of the filter 100.

Figure 20:
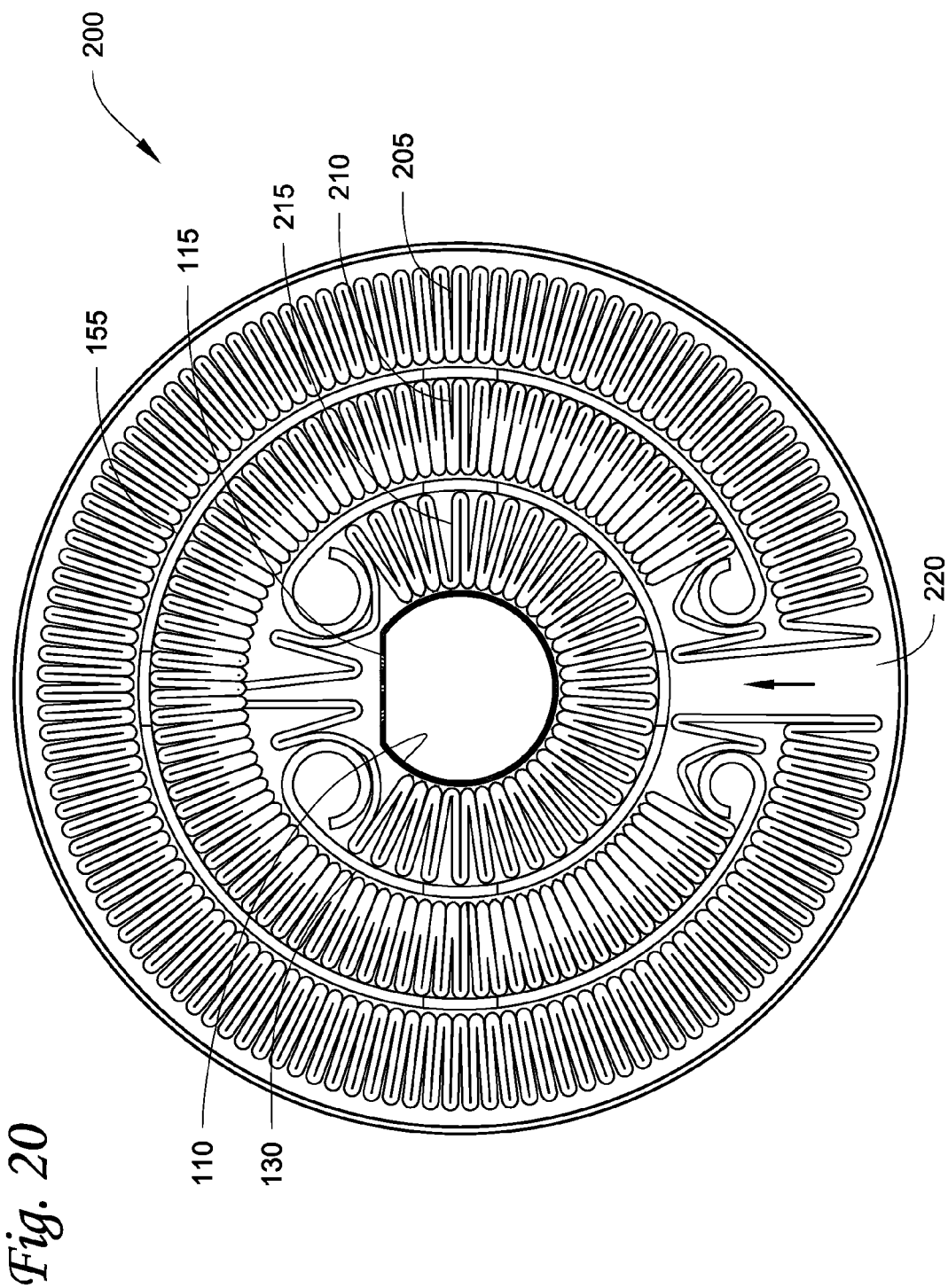
FIG. 20 is an end view of another embodiment of a multi-layered filter.
Figure 21B:
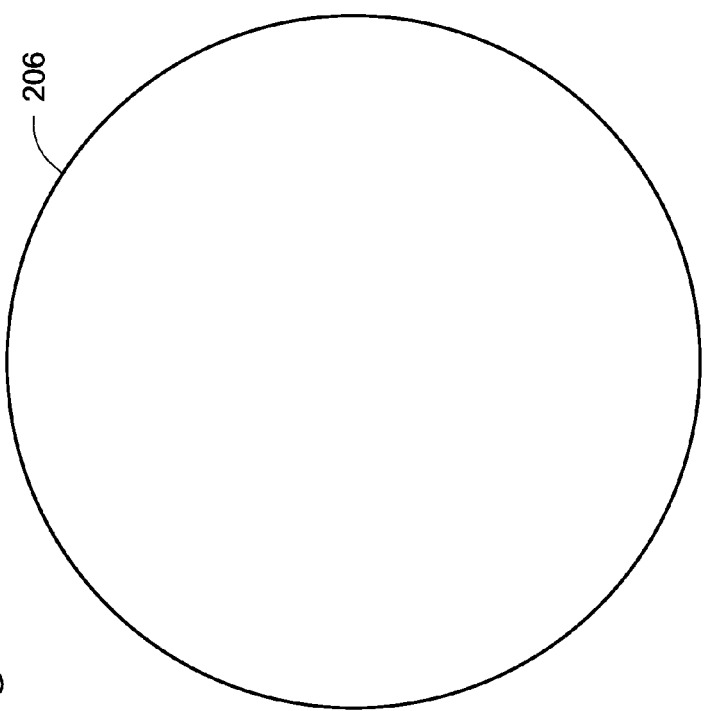
FIGS. 21A and 21B are a top view and a bottom view, respectively, of top and bottom endplates used with the embodiment in FIG. 20.
Figure 21A:
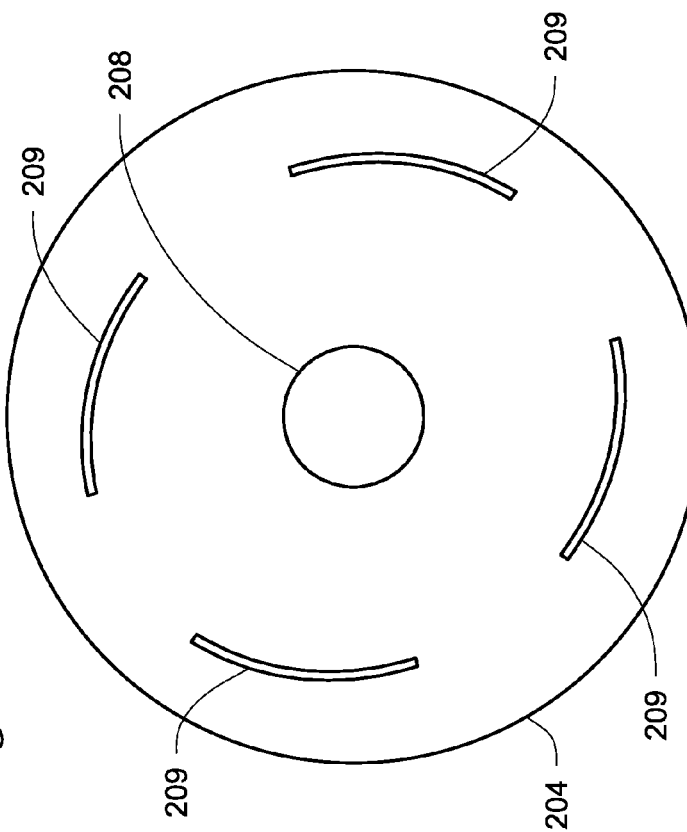
Figure 21C:
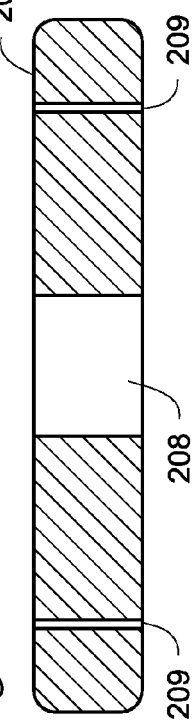
FIG. 21C is a cross-sectional view through the top endplate of FIG. 21A.

FIG. 20 shows another embodiment of a multi-layered filter 200 that includes an outer media layer 205, a middle media layer 210, and an inner media layer 215. Endplates 204, 206, discussed below and shown in FIGS. 21A-C, are used to close off the ends of the filter 200. In this embodiment, the media layers 205, 210, 215 are formed by a single length of media with each of the resulting media layers 205, 210, 215 having the same porosity. The media layers 205, 210, 215 are generally circular in end view although they could be oval or elliptical as well.

The multi-layered filter 200 further includes the inner and middle media retainers 130, 155. The inner media retainer 130 is disposed between the inner media layer 215 and the middle media layer 210 and the middle media retainer 155 is disposed between the middle media layer 210 and the outer media layer 205.

The multi-layered filter 200 can also includes the "D" shaped center tube 110. The inner media layer covers the "D" ring, but not the flat side 115 of the "D" shaped center tube 110.

As shown in FIG. 20, the filter 200 defines a single radial flow channel 220 that allows dirty fluid to flow to the inner 215 and middle 210 layers for filtering. The use of the radial flow channel 220 allows increased surface area for filtering through all three of the media layers 205, 210, 215, giving the filter increased contaminant holding capacity, lower pressure drop and lower face velocity.

With reference to FIGS. 21A-C, a top endplate 204 is used to close the top end of the filter 200 while a bottom endplate 206 is used to close the bottom end. The bottom endplate 206 is substantially solid to seal the bottom end of the filter 200. The top endplate 204 includes a central opening 208 that in use is positioned generally over the center tube 110 to allow filtered fluid to exit the filter through the endplate 204. The endplate 204 also includes a plurality of circumferentially extending openings 209 that, as shown in FIG. 21C, extend through the endplate 204. When the endplate 204 is in position on the filter 200, the openings 209 are located generally over the flow path between the outer media layer 205 and the middle media layer 210 to allow filtered fluid between the layers 205, 210 to flow out the filter through the endplate.

Figure 22:
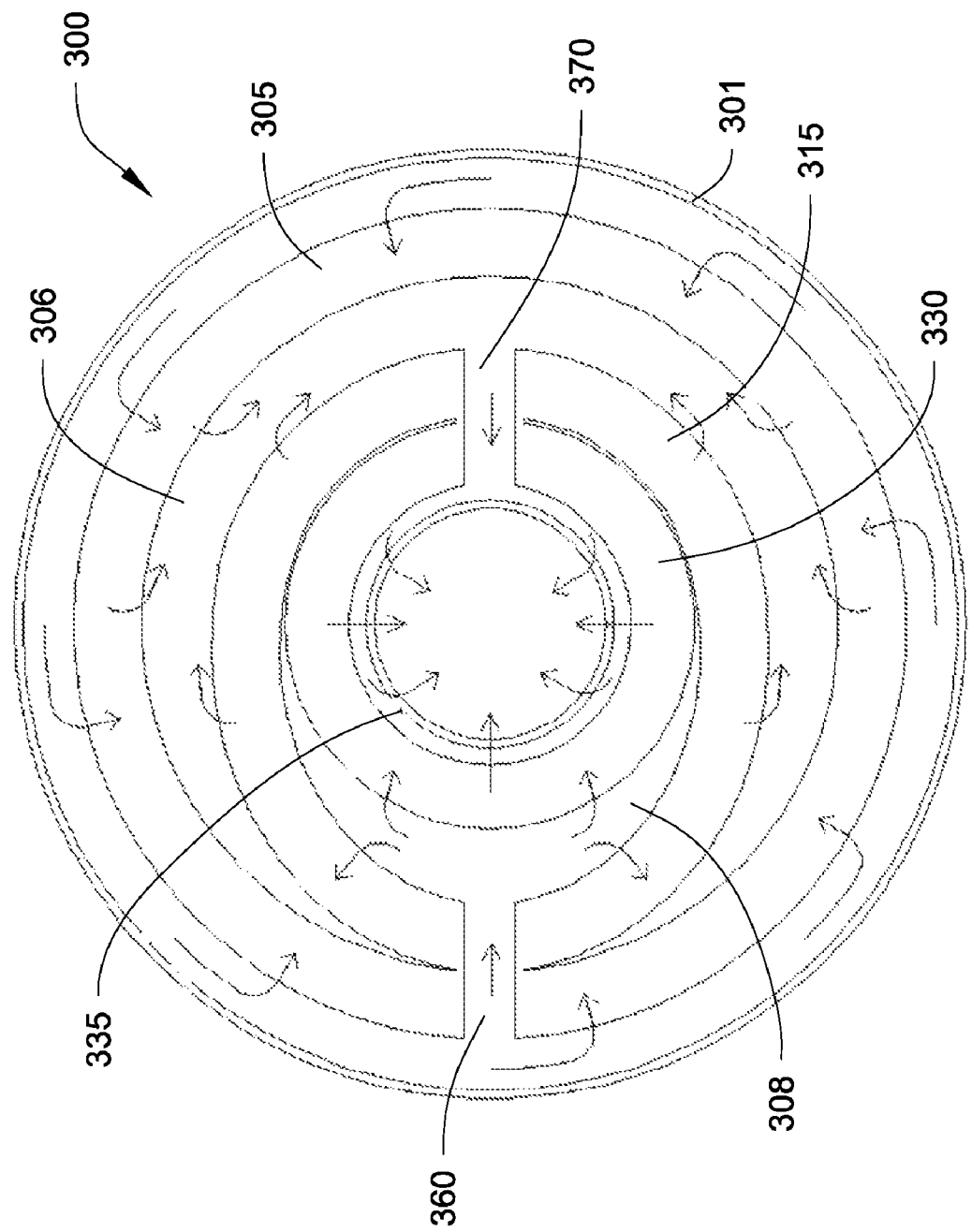
FIG. 22 in an end view of yet another embodiment of a multi-layered filter.

FIG. 22 shows another embodiment of a multi-layered filter 300 that includes an outer media layer 305, a middle media layer 315, and an inner media layer 330. In this embodiment, the inner media layer 330 is generally circular in shape and is concentric with the central axis of the filter 300. The shape of inner media layer 330 however is not particularly limited, and may be oval or elliptical. The middle media layer 315 and the outer media layer 305 are generally elliptical in shape. The media layers 305, 315, 330 are formed by a single length of media with each resulting media layers 305, 315, 330 having the same porosity.

As shown in FIG. 22, a generally crescent shaped flow path 306 is defined between the outer layer 305 and the middle layer 315. Similarly, a generally crescent shaped flow path 308 is defined between the middle layer 315 and the inner layer 330. A first radial flow channel 360 is formed through the middle and outer media layers 315, 305 allowing dirty fluid to directly reach the flow path 308. In addition, a second radial flow channel 370 is formed through the inner and middle media layers 330, 315 allowing filtered fluid in the flow path 306 to exit the filter through a generally circular center tube 335 that is substantially surrounded by the inner media layer 330. The first and second radial flow channels 360, 370 are illustrated as being positioned generally diametrically opposite to one another.

The flow of fluid through the filter 300 is illustrated by the arrows. The fluid flows through and is filtered by only one layer of the filter before exiting the filter. Fluid that flows through the outer layer 305 reaches the flow path 306 and then flows out through the center tube 335 via the radial flow channel 370. Alternatively, fluid to be filtered can enter through the radial flow channel 360 to the flow path 308. The fluid can spread out in the flow path 308, and flow through the inner media layer 330 or flow outwardly through the middle media layer 315 to reach the flow path 306. Fluid that flows through the inner layer 330 flows through the center tube 335 and then out the filter. Fluid that flows through the middle layer 315 flows out the filter via the radial flow passage 370 and the center tube 335. Thus, the radial flow channels 360, 370 allow increased surface area for filtering through all three of the media layers 305, 315, 330, and increased contaminant holding capacity, lower pressure drop and lower face velocity.

Figure 23:
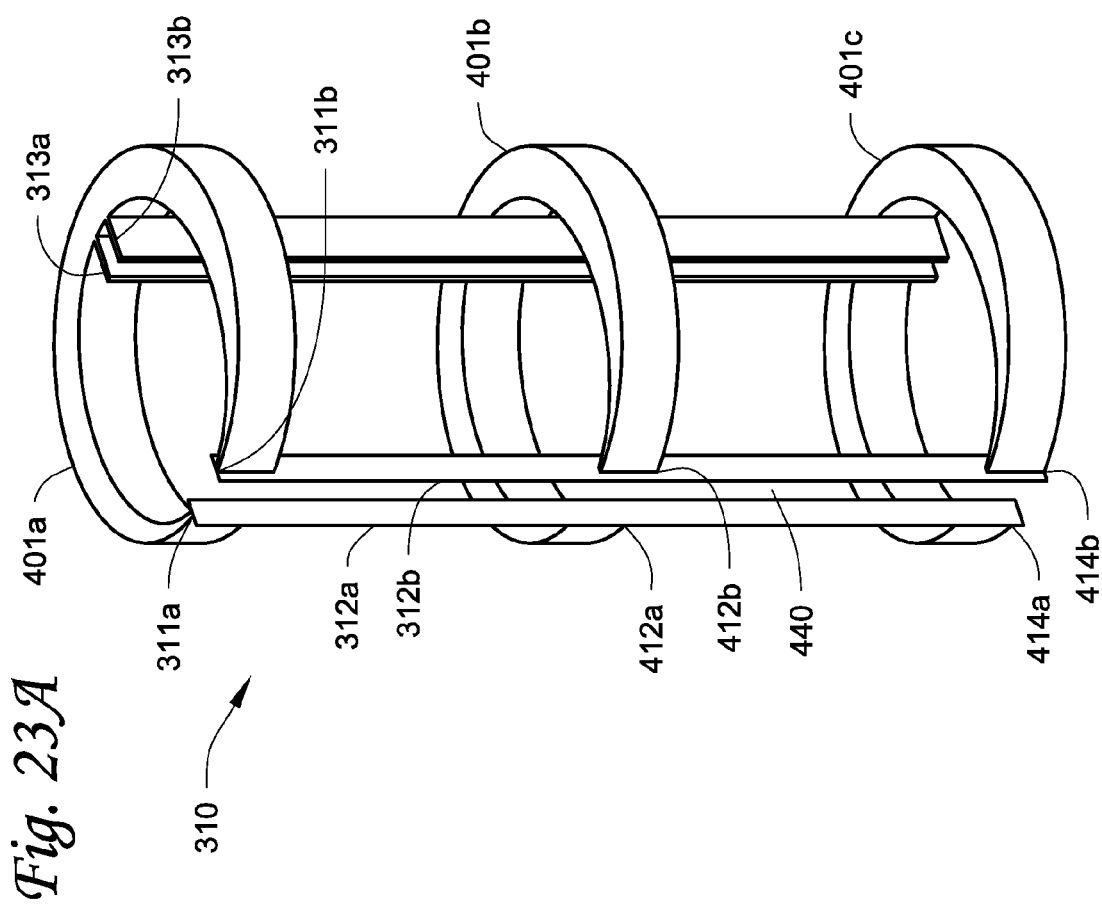
FIG. 23A is a perspective view of a media retainer for use with the filter of FIG. 22.
FIG. 23B is a top view of the media retainer in FIG. 23A.
Figure 24:
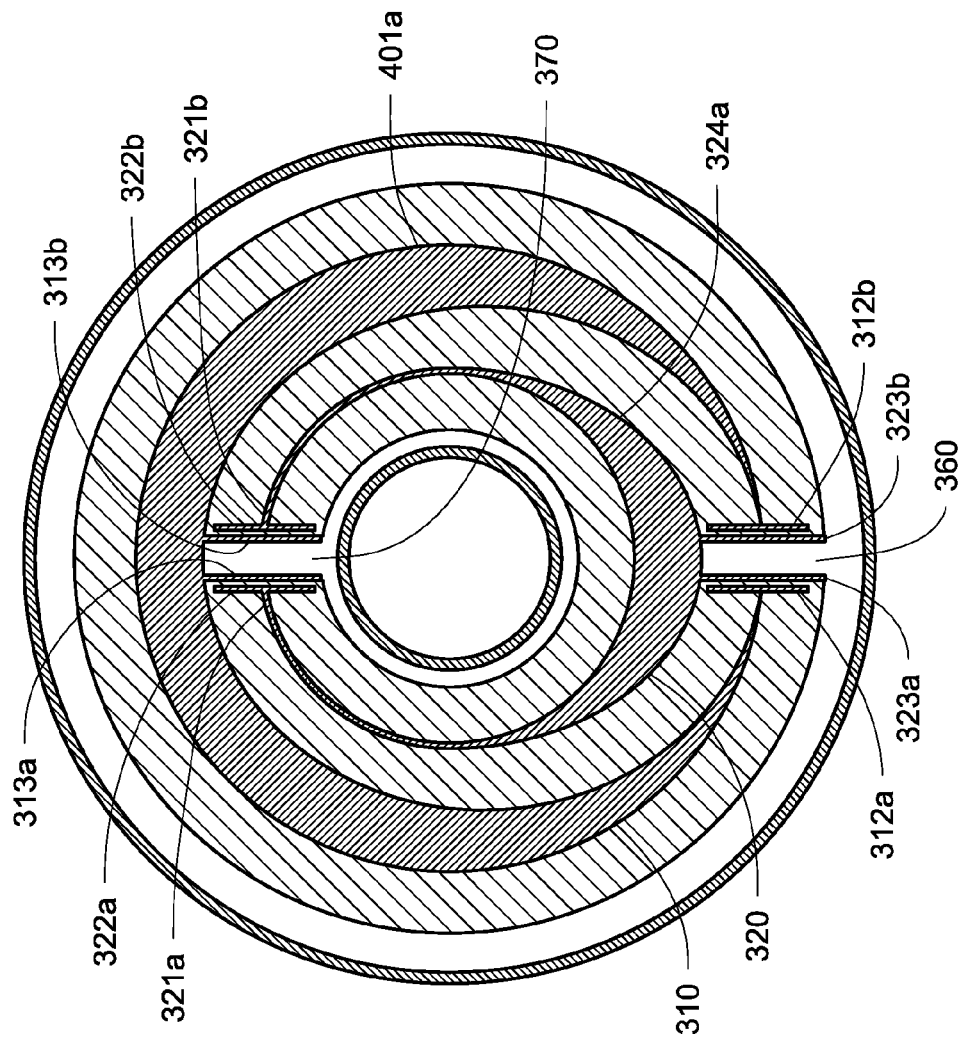
FIG. 24 shows the filter in FIG. 22 with the retainers in position.

The multi-layered filter 300 further includes an inner media retainer 320 and a middle media retainer 310. For sake of convenience, the retainers are not illustrated in FIG. 22. The middle media retainer 310 is illustrated in FIGS. 23A and 23B, while FIG. 24 shows the retainers in place in the filter 300. The retainer 310 is generally cylindrically shaped and includes first, second and third substantially elliptical, vertically spaced bands 401a, 401b, 401c, which aid in retaining the elliptical form of the outer media layer 305 and keep the crescent-shaped flow path 306 open. The bands 401a, 401b, 401c have a generally crescent shape, with a thickness that becomes narrower near facing ends 311a, 311b, 412a, 412b, 414a, 414b of the bands 401a, 401b, 401c.

The middle media retainer 310 also is provided with first, second, third and fourth vertical support strips 313a, 313b, 312a, 312b. The support strips 313a, 313b, 312a, 312b extend from the first elliptical band 401a to the third elliptical band 401c, and are connected at their ends to the bands 401a, 401c and in the middle to the band 401b. The strip 312a extends along the facing ends 311a, 412a, 414a of the bands, while the strip 312b extends along the facing ends 311b, 412b, 414b. The strips 312a and 312b are spaced so as to form an opening 440 therebetween.

The strips 313a, 313b are positioned opposite the facing ends 311a, 311b, 412a, 412b, 414a, 414b of the bands and generally opposite the support strips 312a, 312b. The strips 313a, 313b are provided such that they protrude radially inwardly from the bands and are spaced from each other to form a space 450.

The inner media retainer 320 of the filter 300 has a similar configuration to the middle media retainer 310, including bands (only one band 324a is visible in FIG. 24) to help define the crescent-shaped flow path 308, except that the strips corresponding to strips 313a, 313b protrude radially outwardly from the bands to help define the radial flow channel 360, and the major diameter of the inner media retainer is generally smaller than that of the middle media retainer 310. The inner media retainer 320 of the filter 300 also functions to retain an elliptical shape of the middle media layer 315.

As shown in FIG. 24, the inner media retainer 320 is disposed between the inner media layer 330 and the middle media layer 315 and the middle media retainer 310 is disposed between the middle media layer 315 and the outer media layer 305.

The first and second support strips 313a, 313b of the middle media retainer 310 are provided within the radial flow channel 370. The support strips 313a, 313b allow the flow channel 370 to retain an open configuration so as to allow fluid to flow through the radial flow channel 370 to the center tube. In addition, the third and fourth support strips 312a, 312b of the middle media retainer 310 are embedded in the filter media to aid in retaining the open configuration of the flow channel 360.

The inner media retainer 320 includes first and second strips 323a, 323b that project radially outward from the spaced bands and that are provided within the flow channel 360 to retain the flow channel 360 in an open configuration. The retainer 320 also includes third and fourth strips 322a, 322b that are provided on facing ends 321a, 321b of bands 324a to help retain the open configuration of the flow channel 370.

The media retainers 310, 320 are positioned so that the strips 313a, 313b and 323a, 323b are positioned opposite to one another, thereby resulting in the middle media layer 315 and the outer media layer 305 having an elliptical shape with offset center points. This creates the crescent-shaped flow paths 306, 308 between the layers with the larger cross-sectional areas of the flow paths nearest to the radial flow channels 360, 370 where most flow occurs.

The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A multi-layered filter having a central axis, comprising:
    a center tube that includes a plurality of holes through which fluid can flow and a flat side that extends longitudinally along the length thereof in the direction of the central axis;
    a first media layer disposed around the center tube;
    a second media layer disposed around the first media layer;
    a third media layer disposed around the second media layer;
    the first, second and third media layers, and the center tube are disposed around the central axis of the filter; and
    an inner media retainer between the first and second media layers and disposed around the first media layer, the inner media retainer includes a plurality of retainer loops that are positioned adjacent to the flat side of the center tube.

2. The multi-layered filter of claim 1, comprising a middle media retainer between the second and third media layers; wherein the inner media retainer is configured to retain a geometrical form of the first media layer and the middle retainer is configured to retain a geometrical form of the second and third media layers.

3. The multi-layered filter of claim 2, wherein the geometrical form is a cylindrical shape.

4. The multi-layered filter of claim 1, wherein the first, second and third media layers are formed by a single length of media.

5. The multi-layered filter of claim 1, wherein the inner media retainer includes:
    a plurality of vertically spaced bands that are disposed around the central axis,
    each band having facing ends that are spaced from one another so that the facing ends of each band are not directly attached to one another and there is a gap between the facing ends of each band;
    a plurality of support strips extending between and interconnecting the plurality of bands, the support strips extending generally parallel to the central axis.

6. The multi-layered filter of claim 1, wherein the first, second and third media layers are generally circular, and comprising a single radial flow channel through the second and third media layers.

7. The multi-layered filter of claim 1, further comprising an endplate attached to ends of the first, second and third media layers, the endplate including a central opening for filtered fluid and at least one other opening spaced radially from the central opening for filtered fluid.

8. The multi-layered filter of claim 7, comprising a plurality of the other openings, each of the plurality of the other openings have a circumferential extent and are positioned in the endplate proximate a fluid flow path between the second and third media layers.

9. The multi-layered filter of claim 1, wherein the filter is a particulate filter, a coalescing filter, or a fuel-water separator filter.

* * * * *

UNITED STATES PATENT AND TRADEMARK OFFICE
CERTIFICATE OF CORRECTION

PATENT NO. : 8,147,693 B2
APPLICATION NO. : 12/123653
DATED : April 3, 2012
INVENTOR(S) : Terry et al.

It is certified that error appears in the above-identified patent and that said Letters Patent is hereby corrected as shown below:

Title page, item (73) Assignee: "Cumins Filtration IP, Inc.," should read
--Cummins Filtration IP, Inc.,--

Signed and Sealed this
Sixth Day of November, 2012

David J. Kappos
*Director of the United States Patent and Trademark Office*